(12) United States Patent
Ottinger et al.

(10) Patent No.: US 11,905,867 B2
(45) Date of Patent: Feb. 20, 2024

(54) SYSTEMS AND METHODS FOR CONTROLLING EXHAUST GAS AFTERTREATMENT SENSOR SYSTEMS

(71) Applicant: Cummins Emission Solutions Inc., Columbus, IN (US)

(72) Inventors: Nathan A. Ottinger, Lenoir City, TN (US); M. Yusuf Khan, Greenwood, IN (US); Z. Gerald Liu, Madison, WI (US); Shirish Ambadas Shimpi, Columbus, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/740,891

(22) Filed: May 10, 2022

(65) Prior Publication Data

US 2022/0268189 A1     Aug. 25, 2022

Related U.S. Application Data

(62) Division of application No. 17/002,368, filed on Aug. 25, 2020, now Pat. No. 11,346,264.

(Continued)

(51) Int. Cl.
| | |
|---|---|
| *F01N 3/00* | (2006.01) |
| *F01N 3/08* | (2006.01) |
| *F01N 3/20* | (2006.01) |
| *F01N 3/10* | (2006.01) |
| *F01N 9/00* | (2006.01) |

(Continued)

(52) U.S. Cl.
CPC ........... *F01N 3/0842* (2013.01); *F01N 3/035* (2013.01); *F01N 3/103* (2013.01); *F01N 3/106* (2013.01); *F01N 3/2066* (2013.01); *F01N 9/00* (2013.01); *F01N 13/008* (2013.01); *F01N 13/0093* (2014.06); *F01N 2240/14* (2013.01); *F01N 2250/02* (2013.01); *F01N 2560/02* (2013.01); *F01N 2560/05* (2013.01); *F01N 2560/08* (2013.01); *F01N 2570/14* (2013.01); *F01N 2610/02* (2013.01); *F01N 2610/03* (2013.01); *F01N 2900/0416* (2013.01);

(Continued)

(58) Field of Classification Search
CPC ............... F01N 13/008; F01N 2560/02; F01N 2560/05; F01N 2560/08; F01N 2900/0416
See application file for complete search history.

(56) References Cited

U.S. PATENT DOCUMENTS

| | | | | |
|---|---|---|---|---|
| 5,898,101 A | * | 4/1999 | Lyle ..................... | G01N 27/124 |
| | | | | 73/31.06 |
| 6,227,033 B1 | * | 5/2001 | Kainz ................ | G01N 27/4175 |
| | | | | 123/703 |

(Continued)

OTHER PUBLICATIONS

Office Action in U.S. Appl. No. 17/742,889, dated Mar. 15, 2023.

*Primary Examiner* — Matthew T Largi
(74) *Attorney, Agent, or Firm* — Foley & Lardner LLP

(57) ABSTRACT

An exhaust gas aftertreatment system includes: a first sensor configured to measure a parameter in the exhaust gas aftertreatment system; a second sensor configured to measure the parameter in the exhaust gas aftertreatment system, the second sensor disposed proximate the first sensor; and at least one controller configured to alternately receive sensor values from the first sensor for a first target period of time, and receive sensor values from the second sensor for a second target period of time.

9 Claims, 9 Drawing Sheets

Related U.S. Application Data

(60) Provisional application No. 62/893,545, filed on Aug. 29, 2019.

(51) Int. Cl.
 *F01N 13/00* (2010.01)
 *F01N 3/035* (2006.01)

(52) U.S. Cl.
 CPC .. *F01N 2900/1404* (2013.01); *F01N 2900/16* (2013.01); *F01N 2900/18* (2013.01)

(56) References Cited

U.S. PATENT DOCUMENTS

| | | | | |
|---|---|---|---|---|
| 6,961,653 | B2* | 11/2005 | Maki | F02D 41/222 73/114.71 |
| 9,778,160 | B2* | 10/2017 | Zhang | G01N 15/0606 |
| 2003/0154776 | A1* | 8/2003 | Naik | G01N 27/4175 73/114.73 |
| 2008/0202943 | A1* | 8/2008 | Guenschel | G01N 27/407 205/775 |
| 2008/0295489 | A1* | 12/2008 | Elfvik | F01N 9/007 60/276 |
| 2009/0019918 | A1* | 1/2009 | Baars | G01N 15/0606 73/23.33 |
| 2009/0194831 | A1 | 8/2009 | Casey et al. | |
| 2010/0101409 | A1* | 4/2010 | Bromberg | B01D 46/44 96/397 |
| 2011/0010075 | A1 | 1/2011 | Rogers et al. | |
| 2011/0047973 | A1* | 3/2011 | Wilhelm | F01N 3/035 60/287 |
| 2012/0116645 | A1* | 5/2012 | Hamahata | F01N 13/011 701/102 |
| 2012/0158313 | A1 | 6/2012 | Wang et al. | |
| 2012/0159932 | A1* | 6/2012 | Schelling | F01N 11/00 60/274 |
| 2013/0269316 | A1* | 10/2013 | Steinert | F02D 41/2474 60/276 |
| 2013/0317727 | A1 | 11/2013 | Kowalkowski et al. | |
| 2015/0358091 | A1 | 12/2015 | Sappok et al. | |
| 2018/0038251 | A1* | 2/2018 | Uchiyama | F01N 3/023 |
| 2018/0080404 | A1 | 3/2018 | Nair et al. | |
| 2019/0025158 | A1* | 1/2019 | Tasik | G01M 15/102 |
| 2019/0323398 | A1 | 10/2019 | Bahadur Thapa et al. | |
| 2019/0376460 | A1 | 12/2019 | Michel et al. | |
| 2020/0025054 | A1 | 1/2020 | Barve et al. | |
| 2020/0180775 | A1 | 6/2020 | Cocks et al. | |
| 2020/0339244 | A1 | 10/2020 | Tomescu | |

* cited by examiner

SYSTEMS AND METHODS FOR CONTROLLING EXHAUST GAS AFTERTREATMENT SENSOR SYSTEMS

CROSS-REFERENCE TO RELATED APPLICATIONS

The present application is a divisional application of U.S. patent application Ser. No. 17/002,368, filed Aug. 25, 2020, which claims the benefit of U.S. Provisional Application No. 62/893,545, filed Aug. 29, 2019. The entire contents of these applications are incorporated herein by reference.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a liquid reductant. The catalyst may be included in a catalyst chamber of an exhaust system, such as that of a vehicle or power generation unit. A liquid reductant, such as anhydrous ammonia, aqueous ammonia, diesel exhaust fluid (DEF), or aqueous urea, is typically introduced into the exhaust gas flow prior to the catalyst chamber.

In some applications, failure of sensors to detect various constituents can reduce the efficacy of the exhaust gas aftertreatment system and negatively impact overall system performance.

SUMMARY

Embodiments described herein relate generally to systems and methods for controlling exhaust gas aftertreatment sensor systems.

In one embodiment, an exhaust gas aftertreatment system includes a first sensor configured to measure a parameter in the exhaust gas aftertreatment system; a second sensor configured to measure the parameter in the exhaust gas aftertreatment system, the second sensor disposed proximate the first sensor; and at least one controller configured to: initially, utilize the first sensor as a primary sensor for measuring the parameter in the exhaust gas aftertreatment system; at target intervals: receive a first sensor value from the first sensor, receive a second sensor value from the second sensor, calculate a difference between the first sensor value and the second sensor value, and determine if the difference between the first sensor value and the second sensor value is greater than a threshold value; and if the difference between the first sensor value and the second sensor value is greater than the threshold value, stop utilizing the first sensor as the primary sensor for measuring the parameter in the exhaust gas aftertreatment system, and begin utilizing the second sensor as the primary sensor for measuring the parameter in the exhaust gas aftertreatment system.

In another embodiment, an exhaust gas aftertreatment system includes a first sensor configured to measure a parameter in the exhaust gas aftertreatment system; a second sensor configured to measure the parameter in the exhaust gas aftertreatment system, the second sensor disposed proximate the first sensor; and at least one controller configured to alternately receive sensor values from the first sensor for a first target period of time, and receive sensor values from the second sensor for a second target period of time.

In another embodiment, an exhaust gas aftertreatment system includes a first sensor configured to measure a parameter in the exhaust gas aftertreatment system; a second sensor configured to measure the parameter in the exhaust gas aftertreatment system, the second sensor disposed proximate the first sensor; and at least one controller configured to: simultaneously receive sensor values from the first sensor and receive sensor values from the second sensor.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
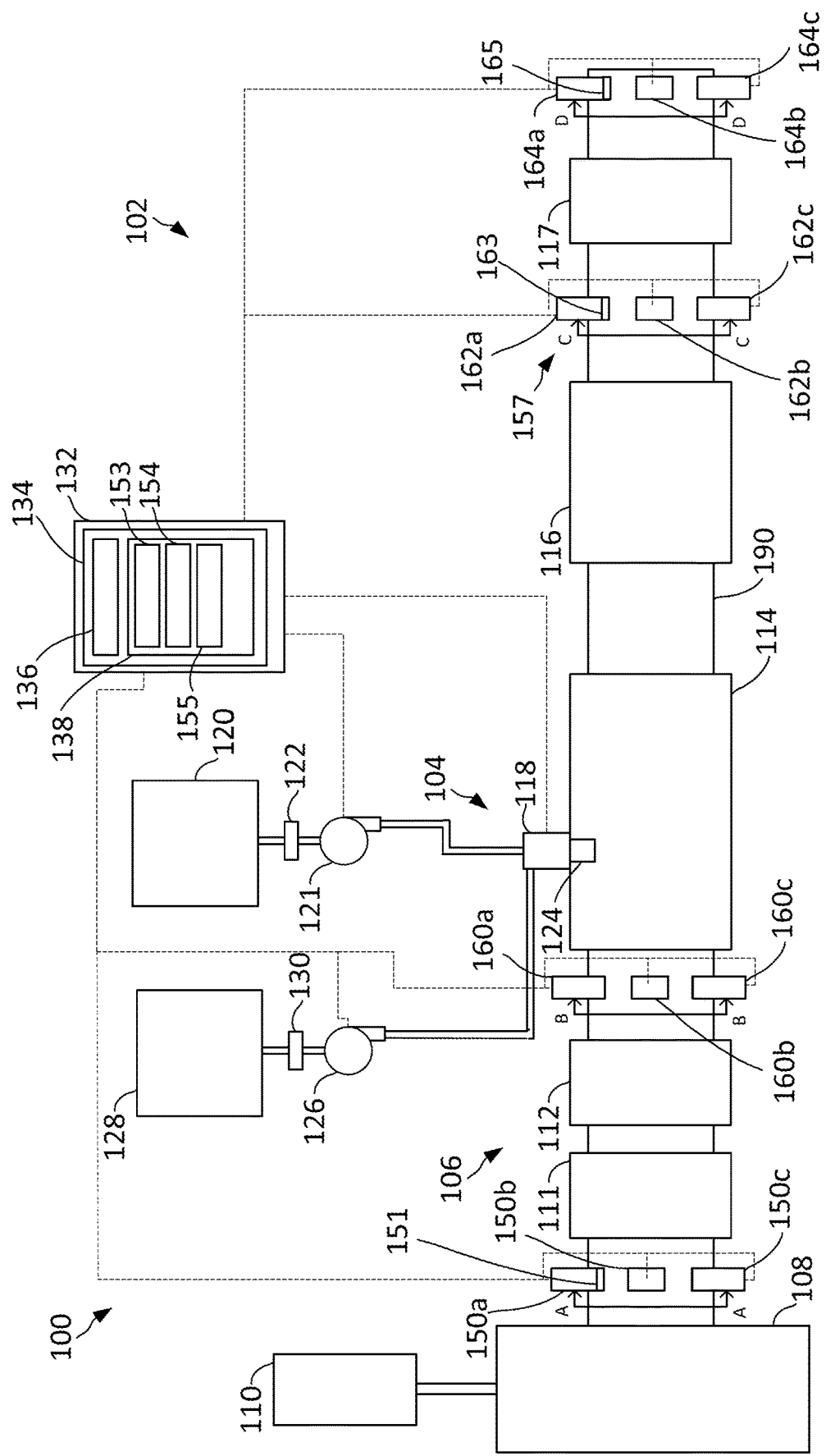
FIG. 1 illustrates a block schematic diagram of an example exhaust gas aftertreatment system having an example reductant delivery system and example exhaust gas aftertreatment sensor system, according to an embodiment.

It will be recognized that some or all of the Figures are schematic representations for purposes of illustration. The Figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for controlling exhaust gas aftertreatment sensor systems. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gas that is often treated within an exhaust gas aftertreatment system. This treatment often includes treating (e.g., dosing, etc.) the exhaust gas with a reductant and subsequently passing the exhaust gas through an SCR catalyst to convert $NO_x$ emissions into more neutral compounds. Sensors can be located in the exhaust gas aftertreatment system to detect the presence of, and/or amounts (e.g., levels, etc.) of, specific compounds (e.g., constituents, etc.). For example, sensors of an exhaust gas aftertreatment sensor system can be used by an exhaust gas aftertreatment system to determine a particulate count of specific constituents. Failure of these sensors can reduce the efficacy of the exhaust gas aftertreatment system and negatively impact overall system performance. Additionally, failure of these sensors can result in significant vehicle downtime and expensive diagnostic and repair cost.

According to one embodiment, the exhaust gas aftertreatment sensor system can operate in a serial process. The exhaust gas aftertreatment sensor system includes a first sensor that is configured to measure a parameter of the exhaust gas flowing through the exhaust gas aftertreatment system. The parameter of the exhaust gas flowing through the exhaust gas aftertreatment system corresponds to at least one of a concentration of gases, pressure difference, particulate matter, or particulate number. The exhaust gas aftertreatment sensor system also includes a second sensor that is configured to measure the parameter (e.g., the same parameter measured by the first sensor) of the exhaust gas flowing through the exhaust gas aftertreatment system. The second sensor is disposed proximate the first sensor. The exhaust gas aftertreatment sensor system can include additional sensors (e.g., a third sensor, a fourth sensor, a fifth sensor, etc.) that all measure the same parameter of the exhaust gas flowing through the exhaust gas aftertreatment system. The exhaust gas aftertreatment sensor system also includes a controller. The controller is configured to initially utilize the first sensor as a primary sensor for measuring the parameter of the exhaust gas. While the first sensor is used as the primary sensor, the second sensor is used as a secondary sensor and the controller does not utilize measurements from the second sensor. If the first sensor should fail, the controller is configured to utilize the second sensor as the primary sensor for measuring the parameter (e.g., upon detection of the failure of the first sensor, etc.) and utilize the first sensor as the secondary sensor, with the controller not utilizing measurements from the first sensor.

According to another embodiment, the exhaust gas aftertreatment sensor system can operate in an alternating selection process. In the alternating selection process, the controller is configured to alternately receive sensor values from a first sensor for a first target period of time, and receive sensor values from a second sensor for a second target period of time. Sensor values correspond to the parameter of the exhaust gas flowing through the exhaust gas aftertreatment system. For example, sensor values are voltage values that the controller receives from the sensors. In this embodiment, the alternating between the first sensor and the second sensor occurs based upon time, and does not depend upon detection of failure of the first sensor or the second sensor.

According to another embodiment, the exhaust gas aftertreatment sensor system can operate in a simultaneous selection process. In the simultaneous selection process, the controller is configured to simultaneously receive sensor values from the first sensor and receive sensor values from the second sensor.

The exhaust gas aftertreatment sensor system described herein may have increased robustness and therefore an extended overall lifetime compared to other sensing systems. By extending the overall lifetime, a cost associated with an exhaust gas aftertreatment system using the exhaust gas aftertreatment sensor system can be decreased compared to aftertreatment systems which use other sensing systems because the exhaust gas aftertreatment system sensor system can remain functional for a longer period of time. Additionally, the exhaust gas aftertreatment sensor system described herein may have increased accuracy compared to other sensing systems because a functionality and accuracy of the exhaust gas aftertreatment sensor system is periodically confirmed. Other sensing systems lack any mechanism for performing periodic accuracy and functionality checks and therefore are prone to becoming inaccurate and/or non-functional at unpredictable, and potentially undesirable, times. By periodically confirming functionality and accuracy, the exhaust gas aftertreatment sensor system described herein may reduce a frequency and number of service events required by other sensing systems because functionality and accuracy are confirmed at times other than during service events.

II. Overview of a First Vehicle System

FIG. 1 illustrates an example vehicle system 100. The vehicle system 100 includes an exhaust gas aftertreatment system 102 having a reductant delivery system 104 for an exhaust gas conduit system 106. The vehicle system 100 also includes an internal combustion engine 108 (e.g., diesel internal combustion engine, diesel hybrid internal combustion engine, gasoline internal combustion engine, natural gas internal combustion engine, liquid propane internal combustion engine, etc.) which produces exhaust gas that is received by the exhaust gas aftertreatment system 102. The internal combustion engine 108 receives fuel (e.g., diesel fuel, gasoline, natural gas, liquid propane, etc.) from a fuel tank 110 (e.g., reservoir, etc.). The fuel tank 110 is configured to be replenished (e.g., by a user, etc.).

The exhaust gas aftertreatment system 102 also includes an oxidation catalyst 111 (e.g., a diesel oxidation catalyst (DOC), etc.). The oxidation catalyst 111 is configured to (e.g., structured to, able to, etc.) promote oxidation of hydrocarbons and/or carbon monoxide in exhaust gas produced by the internal combustion engine 108 and flowing in the exhaust gas conduit system 106. In some implementations, the oxidation catalyst 111 may be omitted.

The exhaust gas aftertreatment system 102 also includes a particulate filter 112 (e.g., a diesel particulate filter (DPF), a gasoline particulate filter (GPF), etc.). The particulate filter 112 is configured to remove particulate matter, such as soot, from the exhaust gas provided by the oxidation catalyst 111. The particulate filter 112 includes an inlet, where the exhaust gas is received, and an outlet, where the exhaust gas exits after having particulate matter substantially filtered from the exhaust gas and/or converting the particulate matter into carbon dioxide. In some implementations, the particulate filter 112 may be omitted.

The exhaust gas aftertreatment system 102 also includes a decomposition chamber 114 (e.g., reactor, reactor pipe, compact mixer, mixer, etc.). The decomposition chamber 114 is configured to convert a reductant into ammonia. The reductant may be, for example, urea, diesel exhaust fluid (DEF), Adblue®, a urea water solution (UWS), an aqueous urea solution (AUS) (e.g., AUS32, etc.), and other similar fluids. The decomposition chamber 114 includes an inlet in fluid communication with the particulate filter 112 to receive the exhaust gas containing $NO_x$ emissions and an outlet for the exhaust gas, $NO_x$ emissions, ammonia, and/or reductant to flow from the decomposition chamber 114.

The exhaust gas aftertreatment system 102 also includes a conversion catalyst 116 (e.g., a selective catalytic reduction (SCR) catalyst, a copper-zeolite SCR catalyst, etc.). The conversion catalyst 116 is configured to assist in the reduction of $NO_x$ emissions by accelerating a $NO_x$ reduction process between the ammonia and the $NO_x$ of the exhaust gas into diatomic nitrogen, water, and/or carbon dioxide. The conversion catalyst 116 includes an inlet in fluid communication with the decomposition chamber 114 from which exhaust gas and reductant are received and an outlet in fluid communication with an end of the exhaust gas conduit system 106.

The decomposition chamber 114 is located upstream of the conversion catalyst 116. As a result, the reductant is injected upstream of the conversion catalyst 116 such that the conversion catalyst 116 receives a mixture of the reductant and exhaust gas. The reductant droplets undergo the processes of evaporation, thermolysis, and hydrolysis to form non-$NO_x$ emissions (e.g., gaseous ammonia, etc.) within the exhaust gas conduit system 106.

The exhaust gas aftertreatment system 102 also includes an ammonia slip catalyst (ASC) 117. The ammonia slip catalyst 117 is configured to assist in the conversion of ammonia ($NH_3$) into diatomic nitrogen. The ammonia slip catalyst 117 is located downstream of the conversion catalyst 116.

The reductant delivery system 104 includes a dosing module 118 (e.g., doser, etc.) configured to dose the reductant into the decomposition chamber 114 (e.g., via an injector, etc.). The dosing module 118 is mounted to the decomposition chamber 114 such that the dosing module 118 may dose the reductant into the exhaust gas flowing in the exhaust gas conduit system 106. The dosing module 118 may include an insulator (e.g., thermal insulator, etc.) and/or isolator (e.g., vibrational isolator, etc.) interposed between a portion of the dosing module 118 and the portion of the decomposition chamber 114 on which the dosing module 118 is mounted.

The dosing module 118 is fluidly coupled to (e.g., fluidly configured to communicate with, etc.) a reductant source 120 (e.g., reductant tank, reductant reservoir, etc.). The reductant source 120 may include multiple reductant sources 120. The reductant source 120 may be, for example, a DEF tank containing Adblue®. A reductant pump 121 (e.g., supply unit, etc.) is used to pressurize the reductant from the reductant source 120 for delivery to the dosing module 118. In some embodiments, the reductant pump 121 is pressure controlled (e.g., controlled to obtain a target pressure, etc.). The reductant pump 121 may draw the reductant through a reductant filter 122. The reductant filter 122 filters (e.g., strains, etc.) the reductant prior to the reductant being provided to internal components (e.g., pistons, vanes, etc.) of the reductant pump 121. For example, the reductant filter 122 may inhibit or prevent the transmission of solids (e.g., solidified reductant, contaminants, etc.) to the internal components of the reductant pump 121. In this way, the reductant filter 122 may facilitate prolonged desirable operation of the reductant pump 121. In some embodiments, the reductant pump 121 is coupled to a chassis of a vehicle associated with the exhaust gas aftertreatment system 102.

The dosing module 118 includes at least one injector 124 (e.g., reductant injector, etc.). Each injector 124 is configured to dose the reductant into the exhaust gas (e.g., within the decomposition chamber 114, etc.). The injector 124 may be positioned to cause the reductant to achieve a target uniformity index (UI) within the exhaust gas at a target location (e.g., at an inlet of the conversion catalyst 116, etc.).

In some embodiments, the reductant delivery system 104 also includes an air pump 126. In these embodiments, the air pump 126 draws air from an air source 128 (e.g., air intake, atmosphere, etc.) and through an air filter 130 disposed upstream of the air pump 126. The air filter 130 filters the air prior to the air being provided to internal components (e.g., pistons, vanes, etc.) of the air pump 126. For example, the air filter 130 may inhibit or prevent the transmission of solids (e.g., debris, branches, dirt, etc.) to the internal components of the air pump 126. In this way, the air filter 130 may facilitate prolonged desirable operation of the air pump 126. The air pump 126 provides the air to the dosing module 118 via a conduit. The dosing module 118 is configured to mix the air and the reductant into an air-reductant mixture and to provide the air-reductant mixture into the decomposition chamber 114. In other embodiments, the reductant delivery system 104 does not include the air pump 126, the air source 128, or the air filter 130. In such embodiments, the dosing module 118 is not configured to mix the reductant with air.

The dosing module 118 and the reductant pump 121 are also electrically or communicatively coupled to an exhaust gas aftertreatment system controller 132. The exhaust gas aftertreatment system controller 132 is configured to control the dosing module 118 to dose the reductant into the decomposition chamber 114. The exhaust gas aftertreatment system controller 132 may also be configured to control the reductant pump 121.

The exhaust gas aftertreatment system controller 132 includes a processing circuit 134. The processing circuit 134 includes a processor 136 and a memory 138. The processor 136 may include a microprocessor, an application-specific integrated circuit (ASIC), a field-programmable gate array (FPGA), etc., or combinations thereof. The memory 138 may include, but is not limited to, electronic, optical, magnetic, or any other storage or transmission device capable of providing a processor, ASIC, FPGA, etc. with program instructions. This memory 138 may include a memory chip, Electrically Erasable Programmable Read-Only Memory (EEPROM), Erasable Programmable Read Only Memory (EPROM), flash memory, or any other suitable memory from which the exhaust gas aftertreatment system controller 132 can read instructions. The instructions may include code from any suitable programming language. The memory 138 may include various modules that include instructions which are configured to be implemented by the processor 136.

While not shown, it is understood that the internal combustion engine 108 includes various components, such as cylinders, pistons, fuel injectors, air intakes, and other similar components. In some applications, the internal combustion engine 108 may include a turbocharger, an exhaust gas recirculation (EGR) system, a waste heat recovery (WHR) system, a cylinder cutout system, and/or other similar components.

In some implementations, the particulate filter 112 may be positioned downstream of the decomposition chamber 114. For instance, the particulate filter 112 and the conversion catalyst 116 may be combined into a single unit. In some implementations, the dosing module 118 may instead be positioned downstream of a turbocharger or upstream of a turbocharger. There may, in some implementations, be more than one SCR catalyst.

III. Overview of a First Exhaust Gas Aftertreatment Sensor System

The vehicle system 100 also includes a first exhaust gas aftertreatment sensor system 157 (e.g., sensing system, sensing assembly, sensor arrangement, accessory sensing system, accessory sensor system, etc.). The first exhaust gas aftertreatment sensor system 157 includes a first engine-out $NO_x$ sensor 150a (e.g., sensing unit, sensing module, sensing component, sensor unit, sensor unit, sensor component, etc.). The first engine-out $NO_x$ sensor 150a is located upstream of the oxidation catalyst 111 and downstream of the internal combustion engine 108. The first exhaust gas aftertreatment sensor system 157 also includes a second engine-out $NO_x$ sensor 150b (e.g., sensing unit, sensing module, sensing component, sensor unit, sensor unit, sensor component, etc.). The second engine-out $NO_x$ sensor 150b is also located upstream of the oxidation catalyst 111 and downstream of the internal combustion engine 108. The second engine-out $NO_x$ sensor 150b may be located upstream of the first engine-out $NO_x$ sensor 150a, downstream of the first engine-out $NO_x$ sensor 150a, or parallel with the first engine-out $NO_x$ sensor 150a. The first exhaust gas aftertreatment sensor system 157 also includes a third engine-out $NO_x$ sensor 150c (e.g., sensing unit, sensing module, sensing component, sensor unit, sensor unit, sensor component, etc.). The third engine-out $NO_x$ sensor 150c is located upstream of the oxidation catalyst 111 and downstream of the internal combustion engine 108. The third engine-out $NO_x$ sensor 150c may be located upstream of the first engine-out $NO_x$ sensor 150a, downstream of the first engine-out $NO_x$ sensor 150a, or parallel with the first engine-out $NO_x$ sensor 150a and upstream of the second engine-out $NO_x$ sensor 150b, downstream of the second engine-out $NO_x$ sensor 150b, or parallel with the second engine-out $NO_x$ sensor 150b.

The first engine-out $NO_x$ sensor 150a, the second engine-out $NO_x$ sensor 150b, and the third engine-out $NO_x$ sensor 150c are each configured to independently determine a $NO_x$ concentration of the exhaust gas exiting the internal combustion engine 108. The exhaust gas aftertreatment system controller 132 is configured to use these $NO_x$ concentrations to, for example, control the dosing module 118 to dose the reductant into the decomposition chamber 114

The first engine-out $NO_x$ sensor 150a can include an engine-out $NO_x$ filter 151. The engine-out $NO_x$ filter 151 can inhibit or prevent intrusion of particulate matter and/or liquid water droplets into any of the first engine-out $NO_x$ sensor 150a, the second engine-out $NO_x$ sensor 150b, or the third engine-out $NO_x$ sensor 150c while facilitating diffusion and flow of exhaust gas molecules into any of the first engine-out $NO_x$ sensor 150a, the second engine-out $NO_x$ sensor 150b, or the third engine-out $NO_x$ sensor 150c. The engine-out $NO_x$ filter 151 can include a filter screen. The second engine-out $NO_x$ sensor 150b can include the engine-out $NO_x$ filter 151. The third engine-out $NO_x$ sensor 150c can include the engine-out $NO_x$ filter 151. The engine-out $NO_x$ filter 151 may or may not be included with any of the first engine-out $NO_x$ sensor 150a, the second engine-out $NO_x$ sensor 150b, or the third engine-out $NO_x$ sensor 150c.

The first exhaust gas aftertreatment sensor system 157 also includes a first particulate sensor 160a (e.g., particulate matter sensor, particulate number sensor, etc.). The first particulate sensor 160a is located upstream of the conversion catalyst 116 (e.g., upstream of the decomposition chamber 114, within the decomposition chamber 114, etc.) and downstream of the particulate filter 112. The first exhaust gas aftertreatment sensor system 157 also includes a second particulate sensor 160b (e.g., particulate matter sensor, particulate number sensor, etc.). The second particulate sensor 160b is located upstream of the conversion catalyst 116 (e.g., upstream of the decomposition chamber 114, within the decomposition chamber 114, etc.) and downstream of the particulate filter 112. The first exhaust gas aftertreatment sensor system 157 also includes a third particulate sensor 160c (e.g., particulate matter sensor, particulate number sensor, etc.). The third particulate sensor 160c is located upstream of the conversion catalyst 116 (e.g., upstream of the decomposition chamber 114, within the decomposition chamber 114, etc.) and downstream of the particulate filter 112.

The first particulate sensor 160a, the second particulate sensor 160b, and the third particulate sensor 160c are each configured to independently determine an amount of particulate matter within the exhaust gas downstream of the particulate filter 112 and upstream of the conversion catalyst 116. The exhaust gas aftertreatment system controller 132 is configured to use these amounts of particulate matter to, for example, determine if a diesel particulate filter 112 is functioning as intended or requires service. For the first particulate sensor 160a, the second particulate sensor 160b, or the third particulate sensor 160c an isokinetic sampling probe can be used to ensure representative sampling and minimal particle loss due to gas velocity gradients near the sampling probe.

The first exhaust gas aftertreatment sensor system 157 also includes a first $NH_3$ sensor 162a (e.g., sensing unit, sensing module, sensing component, sensor unit, sensor unit, sensor component, etc.). The first $NH_3$ sensor 162a is located upstream of the ammonia slip catalyst 117 and downstream of the conversion catalyst 116. The first exhaust gas aftertreatment sensor system 157 also includes a second $NH_3$ sensor 162b (e.g., sensing unit, sensing module, sensing component, sensor unit, sensor unit, sensor component, etc.). The second $NH_3$ sensor 162b is located upstream of the ammonia slip catalyst 117 and downstream of the conversion catalyst 116. The first exhaust gas aftertreatment sensor system 157 also includes a third $NH_3$ sensor 162c (e.g., sensing unit, sensing module, sensing component, sensor unit, sensor unit, sensor component, etc.). The third $NH_3$ sensor 162c is located upstream of the ammonia slip catalyst 117 and downstream of the conversion catalyst 116. In some embodiments, the first $NH_3$ sensor 162a, second $NH_3$ sensor 162b, and third $NH_3$ sensor 162c are located downstream of the ammonia slip catalyst 117.

The first $NH_3$ sensor 162a, the second $NH_3$ sensor 162b, and the third $NH_3$ sensor 162c are each configured to independently determine an $NH_3$ concentration of the exhaust gas exiting the conversion catalyst 116. The exhaust gas aftertreatment system controller 132 is configured to use these $NH_3$ concentrations to, for example, control the dosing module 118 to dose the reductant into the decomposition chamber 114.

The first $NH_3$ sensor 162a can include a $NH_3$ filter 163. The $NH_3$ filter 163 can inhibit or prevent intrusion of particulate matter and/or liquid water droplets into any of the first $NH_3$ sensor 162a, the second $NH_3$ sensor 162b, or the third $NH_3$ sensor 162c while facilitating diffusion and flow of gas molecules into any of the first $NH_3$ sensor 162a, the second $NH_3$ sensor 162b, or the third $NH_3$ sensor 162c. The $NH_3$ filter 163 can include a filter screen. The second $NH_3$ sensor 162b can include the $NH_3$ filter 163. The third $NH_3$ sensor 162c can include the $NH_3$ filter 163. The $NH_3$ filter 163 may or may not be included with the first $NH_3$ sensor 162a, the second $NH_3$ sensor 162b, or the third $NH_3$ sensor 162c.

The first exhaust gas aftertreatment sensor system 157 also includes a first system-out $NO_x$ sensor 164a (e.g., sensing unit, sensing module, sensing component, sensor unit, sensor unit, sensor component, etc.). The first system-out $NO_x$ sensor 164a is located downstream of the ammonia slip catalyst 117. The first exhaust gas aftertreatment sensor system 157 also includes a second system-out $NO_x$ sensor 164b (e.g., sensing unit, sensing module, sensing component, sensor unit, sensor unit, sensor component, etc.). The second system-out $NO_x$ sensor 164b is located downstream of the ammonia slip catalyst 117. The first exhaust gas aftertreatment sensor system 157 also includes a third system-out $NO_x$ sensor 164c (e.g., sensing unit, sensing module, sensing component, sensor unit, sensor unit, sensor component, etc.). The third system-out $NO_x$ sensor 164c is located downstream of the ammonia slip catalyst 117. The first system-out $NO_x$ sensor 164a, the second system-out $NO_x$ sensor 164b, and the third system-out $NO_x$ sensor 164c are each configured to independently determine $NO_x$ concentrations of the exhaust gas exiting the exhaust gas aftertreatment system 102 (e.g., downstream of the ammonia slip catalyst 117, etc.). The exhaust gas aftertreatment system controller 132 is configured to use these $NO_x$ concentrations to, for example, control the dosing module 118 to dose the reductant into the decomposition chamber 114.

The first system-out $NO_x$ sensor 164a can include a system-out $NO_x$ filter 165. The system-out $NO_x$ filter 165 can inhibit or prevent intrusion of particulate matter and/or liquid water droplets into any of the first system-out $NO_x$ sensor 164a, the second system-out $NO_x$ sensor 164b, or the third system-out $NO_x$ sensor 164c while facilitating diffusion and flow of exhaust gas molecules into any of the first system-out $NO_x$ sensor 164a, the second system-out $NO_x$ sensor 164b, or the third system-out $NO_x$ sensor 164c system-out. The system-out $NO_x$ filter 165 can include a filter screen. The second system-out $NO_x$ sensor 164b can include the system-out $NO_x$ filter 165. The third system-out $NO_x$ sensor 164c can include the system-out $NO_x$ filter 165. The system-out $NO_x$ filter 165 may or may not be included with any of the first system-out $NO_x$ sensor 164a, the second system-out $NO_x$ sensor 164b, or the third system-out $NO_x$ sensor 164c.

The first exhaust gas aftertreatment sensor system 157 also includes the exhaust gas aftertreatment system controller 132. The exhaust gas aftertreatment system controller 132 is configured to communicate with the first engine-out $NO_x$ sensor 150a, the second engine-out $NO_x$ sensor 150b, the third engine-out $NO_x$ sensor 150c, the first particulate sensor 160a, the second particulate sensor 160b, the third particulate sensor 160c, the first $NH_3$ sensor 162a, the second $NH_3$ sensor 162b, the third $NH_3$ sensor 162c, the first system-out $NO_x$ sensor 164a, the second system-out $NO_x$ sensor 164b, and/or the third system-out $NO_x$ sensor 164c. The exhaust gas aftertreatment system controller 132 can be implemented across several controllers. For example, a first exhaust gas aftertreatment system controller can control the first engine-out $NO_x$ sensor 150a, the first particulate sensor 160a, the first $NH_3$ sensor 162a, and/or the first system-out $NO_x$ sensor 164a. A second exhaust gas aftertreatment system controller can control the second engine-out $NO_x$ sensor 150b, the second particulate sensor 160b, the second $NH_3$ sensor 162b, and/or the second system-out $NO_x$ sensor 164b. A third exhaust gas aftertreatment system controller can control the third engine-out $NO_x$ sensor 150c, the third particulate sensor 160c, the third $NH_3$ sensor 162c, and/or the third system-out $NO_x$ sensor 164c.

The memory 138 also includes a sensor determination module 153 (e.g., circuit, etc.). The sensor determination module 153 determines, out of a set of sensors (e.g., a first set of sensors including the first engine-out $NO_x$ sensor 150a, the second engine-out $NO_x$ sensor 150b, and the third engine-out $NO_x$ sensor 150c, a second set of sensors including the first particulate sensor 160a, the second particulate sensor 160b, and the third particulate sensor 160c, a third set of sensors including the first $NH_3$ sensor 162a, the second $NH_3$ sensor 162b, and the third $NH_3$ sensor 162c, a fourth set of sensors including the first system-out $NO_x$ sensor 164a, the second system-out $NO_x$ sensor 164b, and the third system-out $NO_x$ sensor 164c, etc.), which sensor (e.g., the first engine-out $NO_x$ sensor 150a, the second engine-out $NO_x$ sensor 150b, the third engine-out $NO_x$ sensor 150c, the first particulate sensor 160a, the second particulate sensor 160b, the third particulate sensor 160c, the first $NH_3$ sensor 162a, the second $NH_3$ sensor 162b, the third $NH_3$ sensor 162c, the first system-out $NO_x$ sensor 164a, the second system-out $NO_x$ sensor 164b, the third system-out $NO_x$ sensor 164c) is the primary sensor. For example, the sensor determination module 153 can determine that of the first engine-out $NO_x$ sensor 150a, the second engine-out $NO_x$ sensor 150b, and the third engine-out $NO_x$ sensor 150c, the first engine-out $NO_x$ sensor 150a is the primary sensor. In another example, the sensor determination module 153 can determine that of the first $NH_3$ sensor 162a, the second $NH_3$ sensor 162b, and the third $NH_3$ sensor 162c, the second $NH_3$ sensor 162b is the primary sensor.

The memory 138 also includes a sensor operation module 155 (e.g., circuit, etc.). The sensor operation module 155 is configured to receive sensor values. For example, the sensor operation module 155 can receive a first sensor value from the first engine-out $NO_x$ sensor 150a, the first particulate sensor 160a, the first $NH_3$ sensor 162a, and/or the first system-out $NO_x$ sensor 164a. The sensor operation module 155 can receive a second sensor value from the second engine-out $NO_x$ sensor 150b, the second particulate sensor 160b, the second $NH_3$ sensor 162b, and/or the second system-out $NO_x$ sensor 164b. The sensor operation module 155 can receive a third sensor value from the third engine-out $NO_x$ sensor 150c, the third particulate sensor 160c, the third $NH_3$ sensor 162c, and/or the third system-out $NO_x$ sensor 164c.

The memory 138 also includes a sensor value difference module 154 (e.g., circuit, etc.). The sensor value difference module 154 stores a difference $D_{1-2}$ between a first sensor value and a second sensor value. The exhaust gas aftertreatment system controller 132 can compare the $D_{1-2}$ to a threshold value to determine if a sensor is failing or has failed. The sensor value difference module 154 also stores a difference $D_{2-3}$ between a second sensor value and a third sensor value. The exhaust gas aftertreatment system controller 132 can compare the $D_{2-3}$ to a threshold value to determine if a sensor is failing or has failed. The sensor value difference module 154 also stores a difference $D_{1-C}$ between a first sensor value and a calculated sensor value (e.g., virtual sensor value, tabulated sensor value, etc.). The exhaust gas aftertreatment system controller 132 can compare the $D_{1-C}$ to a threshold value to determine if a sensor is failing or has failed. The sensor value difference module 154 also stores a difference $D_{2-C}$ between a second sensor value and a calculated sensor value. The exhaust gas aftertreatment system controller 132 can compare the $D_{2-C}$ to a threshold value to determine if a sensor is failing or has failed. The sensor value difference module 154 also stores a difference $D_{3-C}$ between a third sensor value and a calculated sensor value. The exhaust gas aftertreatment system controller 132 can compare the $D_{3-C}$ to a threshold value to determine if a sensor is failing or has failed. The $D_{1-2}$ may be approximately equal to (e.g., within 5% of, etc.) 10 ppm, 5 ppm, 15 ppm, 20 ppm, or other similar values. The $D_{2-3}$ may be approximately equal to 10 ppm, 5 ppm, 15 ppm, 20 ppm, or other similar values. The $D_{1-C}$ may be approximately equal to 10 ppm, 5 ppm, 15 ppm, 20 ppm, or other similar values. The $D_{2-C}$ may be approximately equal to 10 ppm, 5 ppm, 15 ppm, 20 ppm, or other similar values. The $D_{3-C}$ may be approximately equal to 10 ppm, 5 ppm, 15 ppm, 20 ppm, or other similar values.

Figure 2:
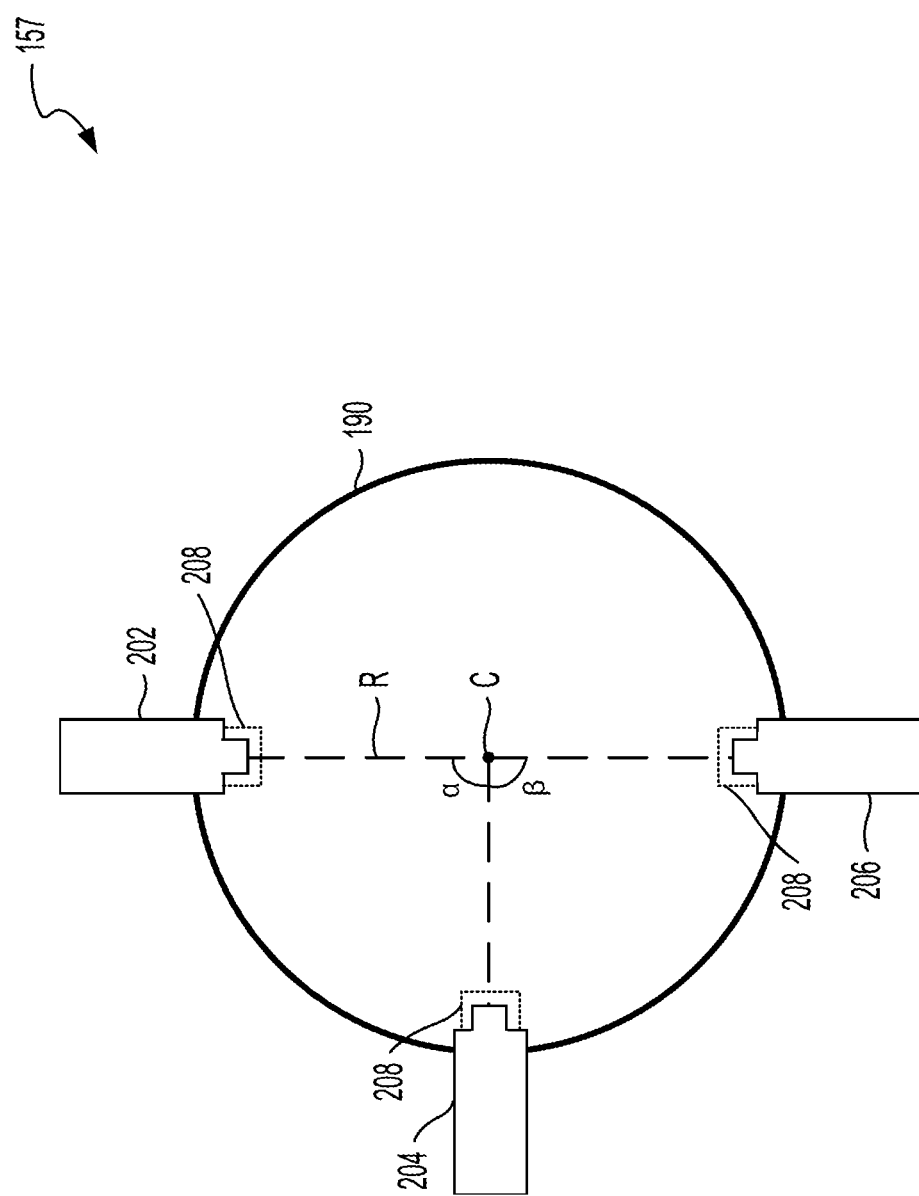
FIG. 2 illustrates a cross-sectional view of the exhaust gas aftertreatment system shown in FIG. 1, taken along plane A-A, plane B-B, plane C-C, or plane D-D, according to an embodiment.

FIG. 2 illustrates a cross-sectional view of the exhaust gas aftertreatment system shown in FIG. 1, taken along plane A-A, plane B-B, plane C-C, or plane D-D, according to an embodiment. The first exhaust gas aftertreatment sensor system 157 includes a first sensor 202 (e.g., sensing unit, sensing module, sensing component, sensor unit, sensor unit, sensor component, etc.) that is configured to measure a parameter in the exhaust gas aftertreatment system 102. The parameter in the exhaust gas aftertreatment system 102 can include a concentration of gas (e.g., $NO_x$, $NH_3$, $O_2$, etc.), particulate matter, particulate number, or pressure. The first sensor 202 includes at least one of a multiple gas sensor, a particulate matter sensor, a particulate number sensor, or a delta pressure sensor. The first sensor 202 is at least one of the first engine-out $NO_x$ sensor 150a, the first particulate sensor 160a, the first $NH_3$ sensor 162a, or the first system-out $NO_x$ sensor 164a.

The first exhaust gas aftertreatment sensor system 157 includes a second sensor 204 (e.g., sensing unit, sensing module, sensing component, sensor unit, sensor unit, sensor component, etc.) that is configured to measure the parameter in the exhaust gas aftertreatment system 102. The second sensor 204 includes at least one of a multiple gas sensor, a particulate matter sensor, a particulate number sensor, or a delta pressure sensor. The second sensor 204 is at least one of the second engine-out $NO_x$ sensor 150b, the second particulate sensor 160b, the second $NH_3$ sensor 162b, or the second system-out $NO_x$ sensor 164b. The first sensor 202 and the second sensor 204 can each be one of the primary sensor or the secondary sensor (e.g., the first sensor can be the primary sensor and the second sensor can be the secondary sensor, the first sensor can be the secondary sensor and the second sensor can be the primary sensor).

The second sensor 204 is disposed proximate the first sensor 202. For example, the second sensor 204 can be in close proximity to the first sensor 202 such that the second sensor 204 and the first sensor 202 give substantially equal sensor values (e.g., readings, etc.). As shown in FIG. 2, the first sensor 202 and the second sensor 204 are located on a plane perpendicular to the flow of the exhaust gas in the exhaust gas aftertreatment system 102. The first sensor 202 is located a distance $D_1$ from a center point C of an exhaust gas conduit 190 of the exhaust gas conduit system 106 as measured along a radius of the exhaust gas conduit 190. The first sensor 202 is coupled to the exhaust gas conduit 190.

Similarly, the second sensor 204 is located a distance $D_2$ from the center point C. The second sensor 204 is coupled to the exhaust gas conduit 190. The location of the first sensor 202 and the second sensor 204 can enable the first exhaust gas aftertreatment sensor system 157 to measure the uniformity of the gas concentration. If the gas concentration is non-uniform, a deposit removal or other diagnostic event can be triggered. The first sensor 202 and the second sensor 204 are separated by an angle α. In one embodiment, the angle α is 90 degrees. However, in various applications the angles may be substantially equal to (e.g., within 5% of, etc.) 40 degrees, 50 degrees, 60 degrees, 70 degrees, 80 degrees, 90 degrees 100 degrees, 110 degrees, 120 degrees, 130 degrees, or other similar values.

In some embodiments, the first exhaust gas aftertreatment sensor system 157 only has the first sensor 202 and the second sensor 204 downstream of the internal combustion engine 108 and upstream of the oxidation catalyst 111. In some embodiments, the first exhaust gas aftertreatment sensor system 157 only has the first sensor 202 and the second sensor 204 upstream of the conversion catalyst 116 and downstream of the particulate filter 112. In some embodiments, the first exhaust gas aftertreatment sensor system 157 only has the first sensor 202 and the second sensor 204 upstream of the ammonia slip catalyst 117 and downstream of the conversion catalyst 116. In some embodiments, the first exhaust gas aftertreatment sensor system 157 only has the first sensor 202 and the second sensor 204 downstream of the ammonia slip catalyst 117.

The first exhaust gas aftertreatment sensor system 157 can include a third sensor 206 (e.g., sensing unit, sensing module, sensing component, sensor unit, sensor unit, sensor component, etc.) that is configured to measure the parameter in the exhaust gas aftertreatment system 102. The third sensor 206 includes at least one of a multiple gas sensor, a particulate matter sensor, a particulate number sensor, or a delta pressure sensor. The third sensor 206 is at least one of the third engine-out $NO_x$ sensor 150c, the third particulate sensor 160c, the third $NH_3$ sensor 162c, or the third system-out $NO_x$ sensor 164c. The third sensor 206 can be a tertiary sensor.

The third sensor 206 is disposed proximate the first sensor 202 and the second sensor 204. As shown in FIG. 2 the second sensor 204 and the third sensor 206 are located on a plane perpendicular to the flow of the exhaust gas in the exhaust gas aftertreatment system 102. The third sensor 206 is located at a distance $D_3$ from the center point C of the exhaust gas conduit 190 of the exhaust gas conduit system 106 as measured along a radius of the exhaust gas conduit 190. The third sensor 206 is coupled to the exhaust gas conduit 190. The second sensor 204 and the third sensor 206 are separated by an angle (3. In one embodiment, the angle θ is 90 degrees. However, in various applications the angles may be substantially equal to 40 degrees, 50 degrees, 60 degrees, 70 degrees, 80 degrees, 90 degrees 100 degrees, 110 degrees, 120 degrees, 130 degrees, or other similar values. The first sensor 202, second sensor 204 and the third sensor 206 can be designed to function with a gas sampling apparatus intended to pull a representative sample from the exhaust gas aftertreatment system 102 (e.g., $NO_x$ sampling wheel). The additional sensors (e.g., second sensor 204, third sensor 206, etc.) can reduce unnecessary service events. The failure of a single sensor does not necessitate a service event, but it is stored in the aftertreatment controller memory and can be replaced at a subsequent service event triggered by a failure unrelated to the sensor system.

In some embodiments, the first exhaust gas aftertreatment sensor system 157 only has the first sensor 202, the second sensor 204, and the third sensor 206 downstream of the internal combustion engine 108 and upstream of the oxidation catalyst 111. In some embodiments, the first exhaust gas aftertreatment sensor system 157 only has the first sensor 202, the second sensor 204, and the third sensor 206 upstream of the conversion catalyst 116 and downstream of the particulate filter 112. In some embodiments, the first exhaust gas aftertreatment sensor system 157 only has the first sensor 202, the second sensor 204, and the third sensor 206 upstream of the ammonia slip catalyst 117 and downstream of the conversion catalyst 116. In some embodiments, the first exhaust gas aftertreatment sensor system 157 only has the first sensor 202, the second sensor 204, and the third sensor 206 downstream of the ammonia slip catalyst 117.

In some embodiments, the sensors can include a filter 208. For example, the first sensor 202, second sensor 204, and the third sensor 206 can include the filter 208. The filter 208 can inhibit or prevent intrusion of particulate matter and/or liquid water droplets into the sensors while facilitating diffusion and flow of gas molecules into any of the first engine-out $NO_x$ sensor 150a, the second engine-out $NO_x$ sensor 150b, the third engine-out $NO_x$ sensor 150c, the first $NH_3$ sensor 162a, the second $NH_3$ sensor 162b, the third $NH_3$ sensor 162c, the first system-out $NO_x$ sensor 164a, the second system-out $NO_x$ sensor 164b, or the third system-out $NO_x$ sensor 164c. The filter 208 can include a filter screen. The filter 208 may or may not be included with the sensors. The filter 208 can be disposed at a side of the sensor exposed to the exhaust gas of the exhaust gas aftertreatment system. The filter 208 can include the engine-out $NO_x$ filter 151, $NH_3$ filter 163 or the system-out $NO_x$ filter 165.

Figure 3:
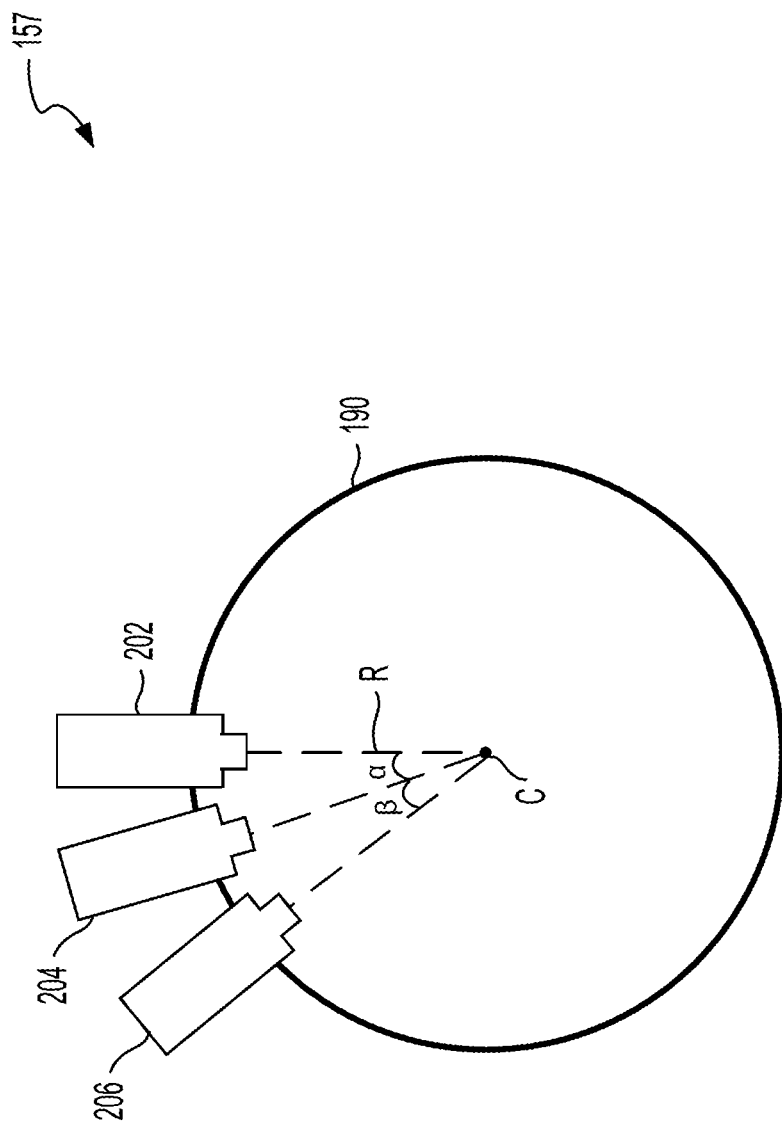
FIG. 3 illustrates a cross-sectional view of the exhaust gas aftertreatment system shown in FIG. 1, taken along plane A-A, plane B-B, plane C-C, or plane D-D, according to an embodiment.

FIG. 3 illustrates a cross-sectional view of the exhaust gas aftertreatment system shown in FIG. 1, taken along plane A-A, plane B-B, plane C-C, or plane D-D, according to an embodiment. The first exhaust gas aftertreatment sensor system 157 includes a first sensor 202 that is configured to measure a parameter in the exhaust gas aftertreatment system 102 and a second sensor 204 configured to measure the parameter in the exhaust gas aftertreatment system 102. The second sensor 204 is disposed proximate the first sensor 202. For example, the first sensor 202 and the second sensor 204 is located on a plane perpendicular to the flow of exhaust gas in the exhaust gas aftertreatment system 102. The first sensor 202 is located at the distance $D_1$ from a center point C of the exhaust gas conduit 190 of the exhaust gas conduit system 106 as measured along a radius of the exhaust gas conduit 190. The first sensor 202 is coupled to the exhaust gas conduit 190. Similarly, the second sensor 204 is located at the distance $D_2$ from the center point C of the exhaust gas conduit 190 of the exhaust gas conduit system 106 as measured along a radius of the exhaust gas conduit 190. The second sensor 204 is coupled to the exhaust gas conduit 190. The location of the first sensor 202 and the second sensor 204 can enable the first exhaust gas aftertreatment sensor system 157 to measure the uniformity of the gas concentration. If the gas concentration is non-uniform, a deposit removal or other diagnostic event can be triggered. The first sensor 202 and the second sensor 204 are separated by an angle α. In one embodiment, the angle α is approximately 30 degrees. However, in various applications the angles may be substantially equal to 20 degrees, 30 degrees, 40 degrees, 50 degrees, 60 degrees, 70 degrees, 80 degrees, 90 degrees 100 degrees, 110 degrees, 120 degrees, 130 degrees, 140 degrees, 150 degrees, 160 degrees, 170 degrees, 180 degrees, or other similar values.

The first exhaust gas aftertreatment sensor system 157 can includes a third sensor 206 that is configured to measure the parameter in the exhaust gas aftertreatment system 102. The third sensor 206 is at least one of a multiple gas sensor, a particulate matter sensor, a particulate number sensor, or a delta pressure sensor. The third sensor 206 can be a tertiary sensor. The third sensor 206 is disposed proximate the first sensor 202 and the second sensor 204. For example, the second sensor 204 and the third sensor 206 is located on a plane perpendicular to the flow of exhaust gas in the exhaust gas aftertreatment system 102. The third sensor 206 is located at the distance $D_3$ from the center point C of the exhaust gas conduit 190 of the exhaust gas conduit system 106 as measured along a radius of the exhaust gas conduit 190. The third sensor 206 is coupled to the exhaust gas conduit 190. The second sensor 204 and the third sensor 206 are separated by an angle β. In one embodiment, the angle β is approximately 30 degrees. However, in various applications the angles may be substantially equal to 20 degrees, 30 degrees, 40 degrees, 50 degrees, 60 degrees, 70 degrees, 80 degrees, 90 degrees 100 degrees, 110 degrees, 120 degrees, 130 degrees, 140 degrees, 150 degrees, 160 degrees, 170 degrees, 180 degrees, or other similar values.

IV. Overview of a Second Vehicle System

Figure 4:
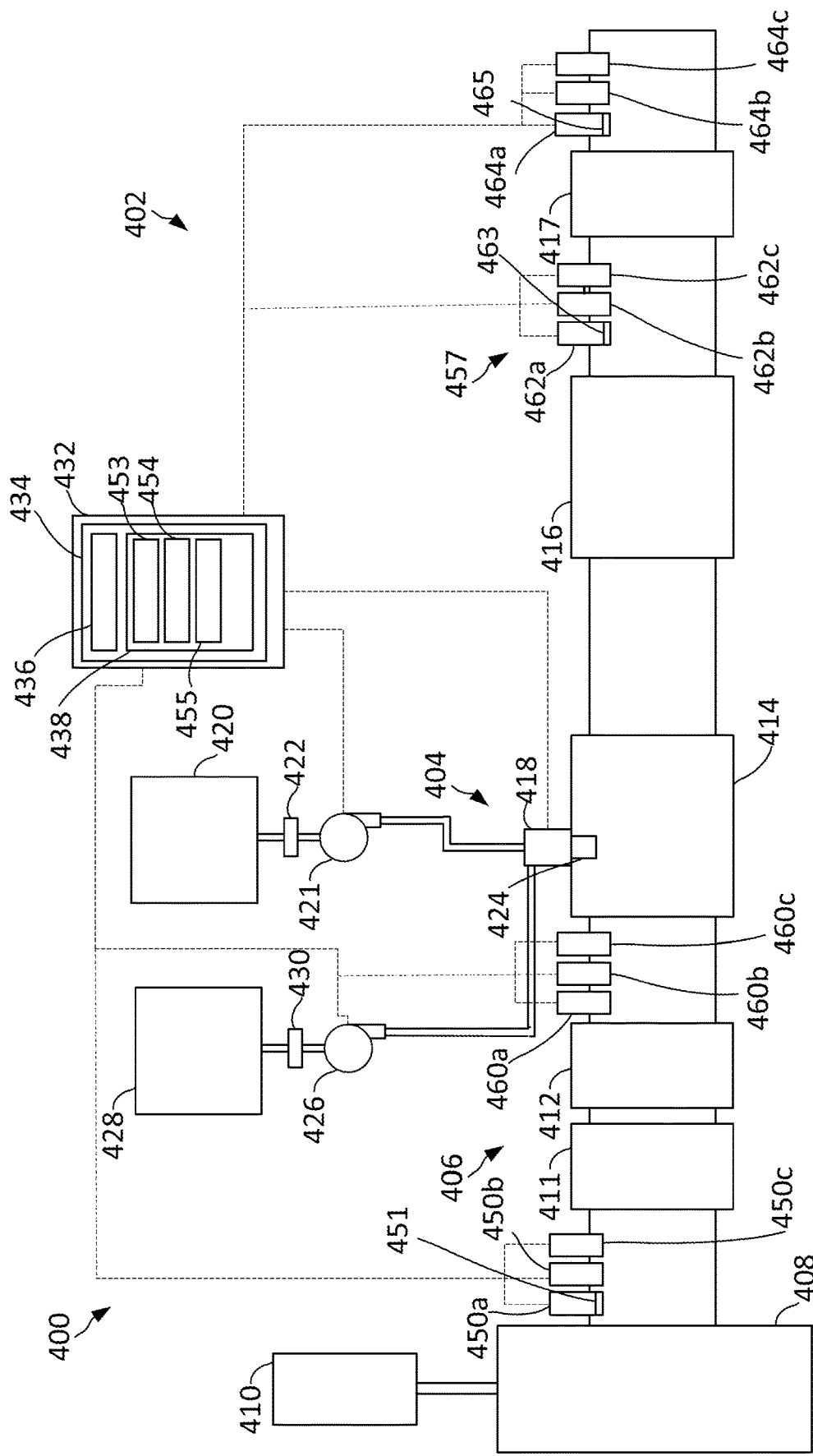
FIG. 4 illustrates a block schematic diagram of an example exhaust gas aftertreatment system having an example reductant delivery system and example exhaust gas aftertreatment sensor system, according to an embodiment.

FIG. 4 illustrates an example vehicle system 400. The vehicle system 400 includes an exhaust gas aftertreatment system 402 having a reductant delivery system 404 for an exhaust gas conduit system 406. The vehicle system 400 also includes an internal combustion engine 408 (e.g., diesel internal combustion engine, diesel hybrid internal combustion engine, gasoline internal combustion engine, natural gas internal combustion engine, liquid propane internal combustion engine, etc.) which produces exhaust gas that is received by the exhaust gas aftertreatment system 402. The internal combustion engine 408 receives fuel (e.g., diesel fuel, gasoline, natural gas, liquid propane, etc.) from a fuel tank 410 (e.g., reservoir, etc.). The fuel tank 410 is configured to be replenished (e.g., by a user, etc.).

The exhaust gas aftertreatment system 402 also includes an oxidation catalyst 411 (e.g., a diesel oxidation catalyst (DOC), etc.). The oxidation catalyst 411 is configured to (e.g., structured to, able to, etc.) promote oxidation of hydrocarbons and/or carbon monoxide in exhaust gas produced by the internal combustion engine 408 and flowing in the exhaust gas conduit system 406. In some implementations, the oxidation catalyst 411 may be omitted.

The exhaust gas aftertreatment system 402 also includes a particulate filter 412 (e.g., a diesel particulate filter (DPF), a gasoline particulate filter (GPF), etc.). The particulate filter 412 is configured to remove particulate matter, such as soot, from the exhaust gas provided by the oxidation catalyst 411. The particulate filter 412 includes an inlet, where the exhaust gas is received, and an outlet, where the exhaust gas exits after having particulate matter substantially filtered from the exhaust gas and/or converting the particulate matter into carbon dioxide. In some implementations, the particulate filter 412 may be omitted.

The exhaust gas aftertreatment system 402 also includes a decomposition chamber 414 (e.g., reactor, reactor pipe, compact mixer, mixer, etc.). The decomposition chamber 414 is configured to convert a reductant into ammonia. The reductant may be, for example, urea, diesel exhaust fluid (DEF), Adblue®, a urea water solution (UWS), an aqueous urea solution (AUS) (e.g., AUS32, etc.), and other similar fluids. The decomposition chamber 414 includes an inlet in fluid communication with the particulate filter 412 to receive the exhaust gas containing $NO_x$ emissions and an outlet for the exhaust gas, $NO_x$ emissions, ammonia, and/or reductant to flow from the decomposition chamber 414.

The exhaust gas aftertreatment system 402 also includes a conversion catalyst 416 (e.g., a selective catalytic reduction (SCR) catalyst, a copper-zeolite SCR catalyst, etc.). The conversion catalyst 416 is configured to assist in the reduction of $NO_x$ emissions by accelerating a $NO_x$ reduction process between the ammonia and the $NO_x$ of the exhaust gas into diatomic nitrogen, water, and/or carbon dioxide. The conversion catalyst 416 includes an inlet in fluid communication with the decomposition chamber 414 from which exhaust gas and reductant are received and an outlet in fluid communication with an end of the exhaust gas conduit system 406.

The decomposition chamber 414 is located upstream of the conversion catalyst 416. As a result, the reductant is injected upstream of the conversion catalyst 416 such that the conversion catalyst 416 receives a mixture of the reductant and exhaust gas. The reductant droplets undergo the processes of evaporation, thermolysis, and hydrolysis to form non-$NO_x$ emissions (e.g., gaseous ammonia, etc.) within the exhaust gas conduit system 406.

The exhaust gas aftertreatment system 402 also includes an ammonia slip catalyst (ASC) 417. The ammonia slip catalyst 417 is configured to assist in the conversion of $NH_3$ into diatomic nitrogen. The ammonia slip catalyst 417 is located downstream of the conversion catalyst 416.

The reductant delivery system 404 includes a dosing module 418 (e.g., doser, etc.) configured to dose the reductant into the decomposition chamber 414 (e.g., via an injector, etc.). The dosing module 418 is mounted to the decomposition chamber 414 such that the dosing module 418 may dose the reductant into the exhaust gas flowing in the exhaust gas conduit system 406. The dosing module 418 may include an insulator (e.g., thermal insulator, etc.) and/or isolator (e.g., vibrational isolator, etc.) interposed between a portion of the dosing module 418 and the portion of the decomposition chamber 414 on which the dosing module 418 is mounted.

The dosing module 418 is fluidly coupled to (e.g., fluidly configured to communicate with, etc.) a reductant source 420 (e.g., reductant tank, reductant reservoir, etc.). The reductant source 420 may include multiple reductant sources 420. The reductant source 420 may be, for example, a DEF tank containing Adblue®. A reductant pump 421 (e.g., supply unit, etc.) is used to pressurize the reductant from the reductant source 420 for delivery to the dosing module 418. In some embodiments, the reductant pump 421 is pressure controlled (e.g., controlled to obtain a target pressure, etc.). The reductant pump 421 may draw the reductant through a reductant filter 422. The reductant filter 422 filters (e.g., strains, etc.) the reductant prior to the reductant being provided to internal components (e.g., pistons, vanes, etc.) of the reductant pump 421. For example, the reductant filter 422 may inhibit or prevent the transmission of solids (e.g., solidified reductant, contaminants, etc.) to the internal components of the reductant pump 421. In this way, the reductant filter 422 may facilitate prolonged desirable operation of the reductant pump 421. In some embodiments, the reductant pump 421 is coupled to a chassis of a vehicle associated with the exhaust gas aftertreatment system 402.

The dosing module 418 includes at least one injector 424 (e.g., reductant injector, etc.). Each injector 424 is configured to dose the reductant into the exhaust gas (e.g., within the decomposition chamber 414, etc.). The injector 424 may be positioned to cause the reductant to achieve a target uniformity index (UI) within the exhaust gas at a target location (e.g., at an inlet of the conversion catalyst 416, etc.).

In some embodiments, the reductant delivery system 404 also includes an air pump 426. In these embodiments, the air pump 426 draws air from an air source 428 (e.g., air intake, atmosphere, etc.) and through an air filter 430 disposed upstream of the air pump 426. The air filter 430 filters the air prior to the air being provided to internal components (e.g., pistons, vanes, etc.) of the air pump 426. For example, the air filter 430 may inhibit or prevent the transmission of solids (e.g., debris, branches, dirt, etc.) to the internal components of the air pump 426. In this way, the air filter 430 may facilitate prolonged desirable operation of the air pump 426. The air pump 426 provides the air to the dosing module 418 via a conduit. The dosing module 418 is configured to mix the air and the reductant into an air-reductant mixture and to provide the air-reductant mixture into the decomposition chamber 414. In other embodiments, the reductant delivery system 404 does not include the air pump 426, the air source 428, or the air filter 430. In such embodiments, the dosing module 418 is not configured to mix the reductant with air.

The dosing module 418 and the reductant pump 421 are also electrically or communicatively coupled to an exhaust gas aftertreatment system controller 432. The exhaust gas aftertreatment system controller 432 is configured to control the dosing module 418 to dose the reductant into the decomposition chamber 414. The exhaust gas aftertreatment system controller 432 may also be configured to control the reductant pump 421.

The exhaust gas aftertreatment system controller 432 includes a processing circuit 434. The processing circuit 434 includes a processor 436 and a memory 438. The processor 436 may include a microprocessor, an application-specific integrated circuit (ASIC), a field-programmable gate array (FPGA), etc., or combinations thereof. The memory 438 may include, but is not limited to, electronic, optical, magnetic, or any other storage or transmission device capable of providing a processor, ASIC, FPGA, etc. with program instructions. This memory 438 may include a memory chip, Electrically Erasable Programmable Read-Only Memory (EEPROM), Erasable Programmable Read Only Memory (EPROM), flash memory, or any other suitable memory from which the exhaust gas aftertreatment system controller 432 can read instructions. The instructions may include code from any suitable programming language. The memory 438 may include various modules that include instructions which are configured to be implemented by the processor 436.

While not shown, it is understood that the internal combustion engine 408 includes various components, such as cylinders, pistons, fuel injectors, air intakes, and other similar components. In some applications, the internal combustion engine 408 may include a turbocharger, an exhaust gas recirculation (EGR) system, a waste heat recovery (WHR) system, and/or other similar components.

In some implementations, the particulate filter 412 may be positioned downstream of the decomposition chamber 414. For instance, the particulate filter 412 and the conversion catalyst 416 may be combined into a single unit. In some implementations, the dosing module 418 may instead be positioned downstream of a turbocharger or upstream of a turbocharger. In some embodiments, more than one SCR catalyst may be used.

V. Overview of a Second Exhaust Gas Aftertreatment Sensor System

The vehicle system 400 also includes a second exhaust gas aftertreatment sensor system 457 (e.g., sensing system, sensing assembly, sensor arrangement, accessory sensing system, accessory sensor system, etc.). The second exhaust gas aftertreatment sensor system 457 includes a first engine-out $NO_x$ sensor 450a (e.g., sensing unit, sensing module, sensing component, sensor unit, sensor unit, sensor component, etc.). The first engine-out $NO_x$ sensor 450a is located upstream of the oxidation catalyst 411 and downstream of the internal combustion engine 408. The second exhaust gas aftertreatment sensor system 457 includes a second engine-out $NO_x$ sensor 450b (e.g., sensing unit, sensing module, sensing component, sensor unit, sensor unit, sensor component, etc.). The second engine-out $NO_x$ sensor 450b may be located upstream of the first engine-out $NO_x$ sensor 450a, downstream of the first engine-out $NO_x$ sensor 450a, or parallel with the first engine-out $NO_x$ sensor 450a. The second engine-out $NO_x$ sensor 450b is located upstream of the oxidation catalyst 411 and downstream of the internal combustion engine 408. The second exhaust gas aftertreatment sensor system 457 includes a third engine-out $NO_x$ sensor 450c (e.g., sensing unit, sensing module, sensing component, sensor unit, sensor unit, sensor component, etc.). The third engine-out $NO_x$ sensor 450c is located upstream of the oxidation catalyst 411 and downstream of the internal combustion engine 408. The third engine-out $NO_x$ sensor 450c may be located upstream of the first engine-out $NO_x$ sensor 450a, downstream of the first engine-out $NO_x$ sensor 450a, or parallel with the first engine-out $NO_x$ sensor 450a and upstream of the second engine-out $NO_x$ sensor 450b, downstream of the second engine-out $NO_x$ sensor 450b, parallel with the second engine-out $NO_x$ sensor 450b.

The first engine-out $NO_x$ sensor 450a, the second engine-out $NO_x$ sensor 450b, and the third engine-out $NO_x$ sensor 450c are each configured to independently determine a $NO_x$ concentration of the exhaust gas exiting the internal combustion engine 408. The exhaust gas aftertreatment system controller 432 is configured to use these $NO_x$ concentrations to, for example, control the dosing module 418 to dose the reductant into the decomposition chamber 414.

The first engine-out $NO_x$ sensor 450a can include an engine-out $NO_x$ filter 451. The engine-out $NO_x$ filter 451 can inhibit or prevent intrusion of particulate matter and/or liquid water droplets into any of the first engine-out $NO_x$ sensor 450a, the second engine-out $NO_x$ sensor 450b, or the third engine-out $NO_x$ sensor 450c while facilitating diffusion and flow of exhaust gas molecules into any of the first engine-out $NO_x$ sensor 450a, the second engine-out $NO_x$ sensor 450b, or the third engine-out $NO_x$ sensor 450c. The engine-out $NO_x$ filter 451 can include a filter screen. The second engine-out $NO_x$ sensor 450b can include the engine-out $NO_x$ filter 451. The third engine-out $NO_x$ sensor 450c can include the engine-out $NO_x$ filter 451. The engine-out $NO_x$ filter 451 may or may not be included with any of the first engine-out $NO_x$ sensor 450a, the second engine-out $NO_x$ sensor 450b, or the third engine-out $NO_x$ sensor 450c.

The second engine-out $NO_x$ sensor 450b is located downstream of the first engine-out $NO_x$ sensor 450a and upstream of the third engine-out $NO_x$ sensor 450c. The location of the first engine-out $NO_x$ sensor 450a relative to the second engine-out $NO_x$ sensor 450b can facilitate the measurement of exhaust gas volumetric flow. For example, the first engine-out $NO_x$ sensor 450a can be axially separated from the second engine-out $NO_x$ sensor 450b by 2 inches. However, in various application, the separation between first engine-out $NO_x$ sensor 450a and the second engine-out $NO_x$ sensor 450b may be substantially equal to 0.5 inches, 1 inches, 1.5 inches, 2 inches, 2.5 inches, 3 inches or other similar values. The third engine-out $NO_x$ sensor 450c can be axially separated from the second engine-out $NO_x$ sensor 450b by 2 inches. However, in various application, the separation between third engine-out $NO_x$ sensor 450c and the second engine-out $NO_x$ sensor 450b may be substantially equal to 0.5 inches, 1 inches, 1.5 inches, 2 inches, 2.5 inches, 3 inches or other similar values.

The second exhaust gas aftertreatment sensor system 457 also includes a first particulate sensor 460a (e.g., particulate matter sensor, particulate number sensor, etc.). The first particulate sensor 460a is located upstream of the conversion catalyst 416 (e.g., upstream of the decomposition chamber 414, within the decomposition chamber 414, etc.) and downstream of the particulate filter 412. The second exhaust gas aftertreatment sensor system 457 includes a second particulate sensor 460b (e.g., particulate matter sensor, particulate number sensor, etc.). The second particulate sensor 460b is located upstream of the conversion catalyst 416 (e.g., upstream of the decomposition chamber 414, within the decomposition chamber 414, etc.) and downstream of the particulate filter 412. The second exhaust gas aftertreatment sensor system 457 includes a third particulate sensor 460c (e.g., particulate matter sensor, particulate number sensor, etc.). The third particulate sensor 460c is located upstream of the conversion catalyst 416 (e.g., upstream of the decomposition chamber 414, within the decomposition chamber 414, etc.) and downstream of the particulate filter 412.

The first particulate sensor 460a, the second particulate sensor 460b, and the third particulate sensor 460c are each configured to independently determine an amount of particulate matter within the exhaust gas downstream of the particulate filter 412 and upstream of the conversion catalyst 416. The exhaust gas aftertreatment system controller 432 is configured to use these amounts of particulate matter to, for example, control the dosing module 418 to dose the reductant into the decomposition chamber 414. For the first particulate sensor 460a, the second particulate sensor 460b, or the third particulate sensor 460c an isokinetic sampling probe can be used to ensure representative sampling and minimal particle loss due to gas velocity gradients near the sampling probe.

The second particulate sensor 460b is located downstream of the first particulate sensor 460a and upstream of the third particulate sensor 460c. The location of the first particulate sensor 460a relative to the second particulate sensor 460b can facilitate the measurement of exhaust gas volumetric flow. For example, the first particulate sensor 460a can be axially separated from the second particulate sensor 460b by 2 inches. However, in various application, the separation between first particulate sensor 460a and the second particulate sensor 460b may be substantially equal to 0.5 inches, 1 inches, 1.5 inches, 2 inches, 2.5 inches, 3 inches or other similar values. The third particulate sensor 460c can be axially separated from the second particulate sensor 460b by 2 inches. However, in various application, the separation between third particulate sensor 460c and the second particulate sensor 460b may be substantially equal to 0.5 inches, 1 inches, 1.5 inches, 2 inches, 2.5 inches, 3 inches or other similar values.

The second exhaust gas aftertreatment sensor system 457 also includes a first $NH_3$ sensor 462a (e.g., sensing unit, sensing module, sensing component, sensor unit, sensor unit, sensor component, etc.). The first $NH_3$ sensor 462a is located upstream of the ammonia slip catalyst 417 and downstream of the conversion catalyst 416. The second exhaust gas aftertreatment sensor system 457 includes a second $NH_3$ sensor 462b (e.g., sensing unit, sensing module, sensing component, sensor unit, sensor unit, sensor component, etc.). The second $NH_3$ sensor 462b is located upstream of the ammonia slip catalyst 417 and downstream of the conversion catalyst 416. The second exhaust gas aftertreatment sensor system 457 includes a third $NH_3$ sensor 462c (e.g., sensing unit, sensing module, sensing component, sensor unit, sensor unit, sensor component, etc.). The third $NH_3$ sensor 462c is located upstream of the ammonia slip catalyst 417 and downstream of the conversion catalyst 416.

The first $NH_3$ sensor 462a, the second $NH_3$ sensor 462b, and the third $NH_3$ sensor 462c are each configured to independently determine an $NH_3$ concentration exiting the conversion catalyst 416. The exhaust gas aftertreatment system controller 432 is configured to use these $NH_3$ concentrations to, for example, control the dosing module 418 to dose the reductant into the decomposition chamber 414.

The first $NH_3$ sensor 462a can include a $NH_3$ filter 463. The $NH_3$ filter 463 can inhibit or prevent intrusion of particulate matter and/or liquid water droplets into any of the first $NH_3$ sensor 462a, the second $NH_3$ sensor 462b, or the third $NH_3$ sensor 462c while facilitating diffusion and flow of gas molecules into any of the first $NH_3$ sensor 462a, the second $NH_3$ sensor 462b, or the third $NH_3$ sensor 462c. The $NH_3$ filter 463 can include a filter screen. The second $NH_3$ sensor 462b can include the $NH_3$ filter 463. The third $NH_3$ sensor 462c can include the $NH_3$ filter 463. The $NH_3$ filter 463 may or may not be included with the first $NH_3$ sensor 462a, the second $NH_3$ sensor 462b, or the third $NH_3$ sensor 462c.

The second $NH_3$ sensor 460b is located downstream of the first $NH_3$ sensor 462a and upstream of the third $NH_3$ sensor 462c. The location of the first $NH_3$ sensor 462a relative to the second $NH_3$ sensor 462b can facilitate the measurement of exhaust gas volumetric flow. For example, the first $NH_3$ sensor 462a can be axially separated from the second $NH_3$ sensor 462b by 2 inches. However, in various application, the separation between first $NH_3$ sensor 462a and the second $NH_3$ sensor 462b may be substantially equal to 0.5 inches, 1 inches, 1.5 inches, 2 inches, 2.5 inches, 3 inches or other similar values. The third $NH_3$ sensor 462c can be axially separated from the second $NH_3$ sensor 462b by 2 inches. However, in various application, the separation between third $NH_3$ sensor 462c and the second $NH_3$ sensor 462b may be substantially equal to 0.5 inches, 1 inches, 1.5 inches, 2 inches, 2.5 inches, 3 inches or other similar values.

The second exhaust gas aftertreatment sensor system 457 also includes a first system-out $NO_x$ sensor 464a (e.g., sensing unit, sensing module, sensing component, sensor unit, sensor unit, sensor component, etc.). The first system-out $NO_x$ sensor 464a is located downstream of the ammonia slip catalyst 417. The second exhaust gas aftertreatment sensor system 457 includes a second system-out $NO_x$ sensor 464b (e.g., sensing unit, sensing module, sensing component, sensor unit, sensor unit, sensor component, etc.). The second system-out $NO_x$ sensor 464b is located downstream of the ammonia slip catalyst 417. The second exhaust gas aftertreatment sensor system 457 includes a third system-out $NO_x$ sensor 464c (e.g., sensing unit, sensing module, sensing component, sensor unit, sensor unit, sensor component, etc.). The third system-out $NO_x$ sensor 464c is located downstream of the ammonia slip catalyst 417. The first system-out $NO_x$ sensor 464a, the second system-out $NO_x$ sensor 464b, and the third system-out $NO_x$ sensor 464c are configured to determine $NO_x$ concentrations of the exhaust gas exiting the exhaust gas aftertreatment system 402 (e.g., downstream of the ammonia slip catalyst 417, etc.). The exhaust gas aftertreatment system controller 432 is configured to use these $NO_x$ concentrations to, for example, control the dosing module 418 to dose the reductant into the decomposition chamber 414.

The first system-out $NO_x$ sensor 464a can include a system-out $NO_x$ filter 465. The system-out $NO_x$ filter 465 can inhibit or prevent intrusion of particulate matter and/or liquid water droplets into any of the first system-out $NO_x$ sensor 464a, the second system-out $NO_x$ sensor 464b, or the third system-out $NO_x$ sensor 464c while facilitating diffusion and flow of exhaust gas molecules into any of the first system-out $NO_x$ sensor 464a, the second system-out $NO_x$ sensor 464b, or the third system-out $NO_x$ sensor 464c. The system-out $NO_x$ filter 465 can include a filter screen. The second system-out $NO_x$ sensor 464b can include the system-out $NO_x$ filter 465. The third system-out $NO_x$ sensor 464c can include the system-out $NO_x$ filter 465. The system-out $NO_x$ filter 465 may or may not be included with the first system-out $NO_x$ sensor 464a, the second system-out $NO_x$ sensor 464b, or the third system-out $NO_x$ sensor 464c.

The location of the first sensor 202 and the second sensor 204 can facilitate the measurement of exhaust gas volumetric flow. In a configuration with axially adjacent sensors of the same function, the time between when a concentration change affects a sensor could be used to estimate the exhaust volumetric flow. For example, the first system-out $NO_x$ sensor 464a could be axially separated from the second system-out $NO_x$ sensor 464b by 2 inches. However, in various application, the separation between first system-out $NO_x$ sensor 464a and the second system-out $NO_x$ sensor 464b may be substantially equal to 0.5 inches, 1 inches, 1.5 inches, 2 inches, 2.5 inches, 3 inches or other similar values. The third system-out $NO_x$ sensor 464c could be axially separated from the second system-out $NO_x$ sensor 464b by 2 inches. However, in various application, the separation between third system-out $NO_x$ sensor 464c and the second system-out $NO_x$ sensor 464b may be substantially equal to 0.5 inches, 1 inches, 1.5 inches, 2 inches, 2.5 inches, 3 inches or other similar values. The second system-out $NO_x$ sensor 464b can be located downstream from the first system-out $NO_x$ sensor 464a. The second system-out $NO_x$ sensor 464b could respond to an increase in $NO_x$ a certain time after the upstream sensor, in this case, the first system-out $NO_x$ sensor 464a. The volume of the exhaust piping separating the first system-out $NO_x$ sensor 464a and the second system-out $NO_x$ sensor 464b can be used to estimate the volumetric flow rate.

The second exhaust gas aftertreatment sensor system 457 also includes the exhaust gas aftertreatment system controller 432. The exhaust gas aftertreatment system controller 432 is configured to communicate with the first engine-out $NO_x$ sensor 450a, the second engine-out $NO_x$ sensor 450b, the third engine-out $NO_x$ sensor 450c, the first particulate sensor 460a, the second particulate sensor 460b, the third particulate sensor 460c, the first $NH_3$ sensor 462a, the second $NH_3$ sensor 462b, the third $NH_3$ sensor 462c, the first system-out $NO_x$ sensor 464a, the second system-out $NO_x$ sensor 464b, and/or the third system-out $NO_x$ sensor 464c. The exhaust gas aftertreatment system controller 432 can be implemented across several controllers. For example, a first exhaust gas aftertreatment system controller can control the first engine-out $NO_x$ sensor 450a, the first particulate sensor

460a, the first NH$_3$ sensor 462a, and/or the first system-out NO$_x$ sensor 464a. A second exhaust gas aftertreatment system controller can control the second engine-out NO$_x$ sensor 450b, the second particulate sensor 460b, the second NH$_3$ sensor 462b, and/or the second system-out NO$_x$ sensor 464b. A third exhaust gas aftertreatment system controller can control the third engine-out NO$_x$ sensor 450c, the third particulate sensor 460c, the third NH$_3$ sensor 462c, and/or the third system-out NO$_x$ sensor 464c.

The memory 438 also includes a sensor determination module 453 (e.g., circuit, etc.). The sensor determination module 453 determines, out of a set of sensors (e.g., a first set of sensors including the first engine-out NO$_x$ sensor 450a, the second engine-out NO$_x$ sensor 450b, and the third engine-out NO$_x$ sensor 450c, a second set of sensors including the first particulate sensor 460a, the second particulate sensor 460b, and the third particulate sensor 460c, a third set of sensors including the first NH$_3$ sensor 462a, the second NH$_3$ sensor 462b, and the third NH$_3$ sensor 462c, a fourth set of sensors including the first system-out NO$_x$ sensor 464a, the second system-out NO$_x$ sensor 464b, and the third system-out NO$_x$ sensor 464c, etc.), which sensor (e.g., the first engine-out NO$_x$ sensor 450a, the second engine-out NO$_x$ sensor 450b, the third engine-out NO$_x$ sensor 450c, the first particulate sensor 460a, the second particulate sensor 460b, the third particulate sensor 460c, the first NH$_3$ sensor 462a, the second NH$_3$ sensor 462b, the third NH$_3$ sensor 462c, the first system-out NO$_x$ sensor 464a, the second system-out NO$_x$ sensor 464b, the third system-out NO$_x$ sensor 464c) is the primary sensor. For example, the sensor determination module 453 can determine that of the first engine-out NO$_x$ sensor 450a, the second engine-out NO$_x$ sensor 450b, and the third engine-out NO$_x$ sensor 450c, the first engine-out NO$_x$ sensor 450a is the primary sensor. In another example, the sensor determination module 453 can determine that of the first NH$_3$ sensor 462a, the second NH$_3$ sensor 462b, and the third NH$_3$ sensor 462c, the second NH$_3$ sensor 462b is the primary sensor.

The memory 438 also includes a sensor operation module 455 (e.g., circuit, etc.). The sensor operation module 455 can receive sensor values. For example, the sensor operation module 455 can receive a first sensor value from the first engine-out NO$_x$ sensor 450a, the first particulate sensor 460a, the first NH$_3$ sensor 462a, and/or the first system-out NO$_x$ sensor 464a. The sensor operation module 455 can receive a second sensor value from the second engine-out NO$_x$ sensor 450b, the second particulate sensor 460b, the second NH$_3$ sensor 462b, and/or the second system-out NO$_x$ sensor 464b. The sensor operation module 455 can receive a third sensor value from the third engine-out NO$_x$ sensor 450c, the third particulate sensor 460c, the third NH$_3$ sensor 462c, and/or the third system-out NO$_x$ sensor 464c.

The memory 438 also includes a sensor value difference module 454 (e.g., circuit, etc.). The sensor value difference module 454 stores a difference $D_{1-2}$ between a first sensor value and a second sensor value. The exhaust gas aftertreatment system controller 432 can compare the $D_{1-2}$ to a threshold value to determine if a sensor is failing or has failed. The sensor value difference module 454 stores a difference $D_{2-3}$ between a second sensor value and a third sensor value. The exhaust gas aftertreatment system controller 432 can compare the $D_{2-3}$ to a threshold value to determine if a sensor is failing or has failed. The sensor value difference module 454 stores a difference $D_{1-C}$ between a first sensor value and a calculated sensor value. The exhaust gas aftertreatment system controller 432 can compare the $D_{1-C}$ to a threshold value to determine if a sensor is failing or has failed. The sensor value difference module 454 stores a difference $D_{2-C}$ between a second sensor value and a calculated sensor value. The exhaust gas aftertreatment system controller 432 can compare the $D_{2-C}$ to a threshold value to determine if a sensor is failing or has failed. The sensor value difference module 454 stores a difference $D_{3-C}$ between a third sensor value and a calculated sensor value. The exhaust gas aftertreatment system controller 432 can compare the $D_{3-C}$ to a threshold value to determine if a sensor is failing or has failed. The $D_{1-2}$ may be approximately equal to 10 ppm, 5 ppm, 15 ppm, 20 ppm, or other similar values. The $D_{2-3}$ may be approximately equal to 10 ppm, 5 ppm, 15 ppm, 20 ppm, or other similar values. The $D_{1-C}$ may be approximately equal to 10 ppm, 5 ppm, 15 ppm, 20 ppm, or other similar values. The $D_{2-C}$ may be approximately equal to 10 ppm, 5 ppm, 15 ppm, 20 ppm, or other similar values. The $D_{3-C}$ may be approximately equal to 10 ppm, 5 ppm, 15 ppm, 20 ppm, or other similar values.

Figure 5:
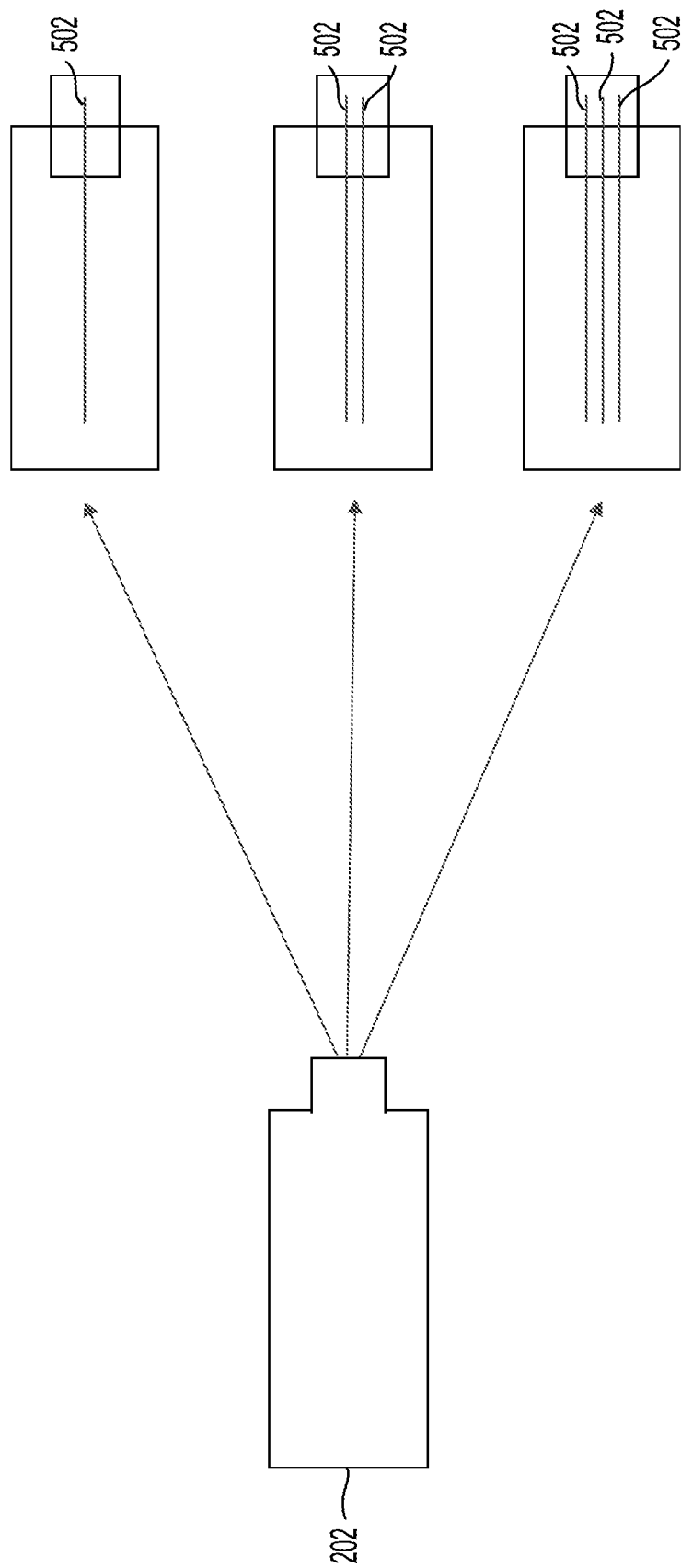
FIG. 5 illustrates a diagram of an example sensor for an exhaust gas aftertreatment sensor system, according to an embodiment.

FIG. 5 illustrates a diagram of an example sensor, according to an embodiment. The first sensor 202 can include one or more sensing elements 502. Each of the sensing elements can include, for example, one or more resistive elements, one or more electrochemical cells, etc. The resistance of the resistive elements can change based on an amount of particulate matter deposited on the resistive element. The electrochemical cells can measure a gas concentration (e.g., NO$_x$ concentration). For example, the sensing element 502 can include a first electrochemical cell and a second electrochemical cell. The first electrochemical cell can be configured to pump O$_2$ out of a gas sample. The O$_2$ in the first electrochemical cell can be reduced to form O$^{2-}$ ions which can then be pumped through a zirconia electrolyte by applying a first pumping current. The first pumping current is proportional to the O$_2$ concentration. The gas sample can diffuse into the second electrochemical cell configured to decompose NO$_x$ into N$_2$ and O$_2$. The O$_2$ in the second electrochemical cell can be reduced to form O$^{2-}$ ions which can then be pumped through a zirconia electrolyte by applying a second pumping current. The second pumping current is proportional to the O$_2$ concentration from the NO$_x$ decomposition. The second pumping current can be used to determine the NO$_x$ concentration in the gas sample.

For example, the first sensor 202 can be a sensing module that includes a single sensing element 502. The first sensor 202 can be a sensing module that includes two sensing elements 502. The first sensor 202 can be a sensing module that includes three sensing elements 502. The first sensor 202 can include more than three sensing elements 502. A sensor with multiple sensing elements 502 can include sensing elements 502 that measure the same parameter or that measure different parameters. The sensor with multiple sensing elements 502 can provide spatial proximity of the multiple sensing elements 502. The sensor with multiple sensing elements 502 can be of lower cost to install and manufacture than a sensor with a single sensing element 502. The multiple sensing elements 502 of the sensor can make measurements on the same gas volume, which could contribute to reducing uncertainty in the measurements based on spatial gas concentration variation that other separate sensing modules or sensors could measure.

Figure 6B:
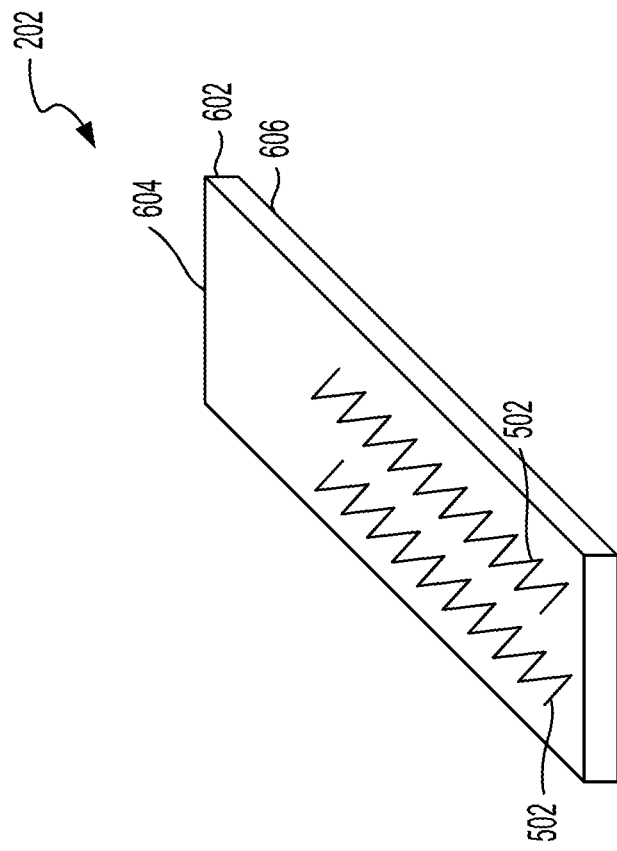
FIG. 6B illustrates a diagram of an example sensor with multiple sensing elements for an exhaust gas aftertreatment sensor system, according to an embodiment.
Figure 6A:
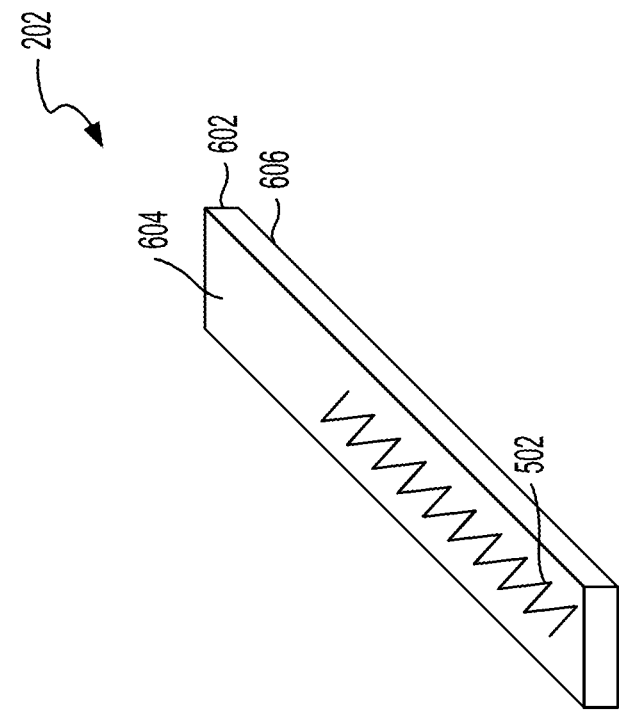
FIG. 6A illustrates a diagram of an example sensor with a single sensing element for an exhaust gas aftertreatment sensor system, according to an embodiment.

FIG. 6A illustrates a diagram of an example sensor with a single sensing element 502, according to an embodiment. The first sensor 202 includes a substrate 602, which can include a refractory material such as zirconia or yttria-stabilized zirconia. The sensing element 502 is disposed on the substrate 602. The substrate 602 includes a first side 604

(e.g., top side) and a second side 606 (e.g., bottom side). The first side 604 and the second side 606 can be different sides (e.g., opposite sides, adjacent sides, etc.) of the substrate 602.

FIG. 6B illustrates a diagram of an example sensor with multiple sensing elements 502, according to an embodiment. For example, two or more sensing elements 502 can be disposed on the substrate 602. The first sensor 202 can include a first sensing element 502 and a second sensing element 502. The first sensing element 502 and the second sensing element 502 can be located on the same side of the substrate 602. For example, the first sensing element 502 and the second sensing element 502 can be located on the first side 604 of the substrate 602. Alternatively, the first sensing element 502 and the second sensing element 502 can be located on different sides of the substrate 602. For example, the first sensing element 502 can be located on the first side 604 of the substrate 602, while the second sensing element 502 can be located on the second side 606 of the substrate 602. Regardless of the configuration, the first sensing element 502 and the second sensing element 502 can make measurements on the same gas volume.

VI. Example Serial Process for an Exhaust Gas Aftertreatment System

Figure 7:
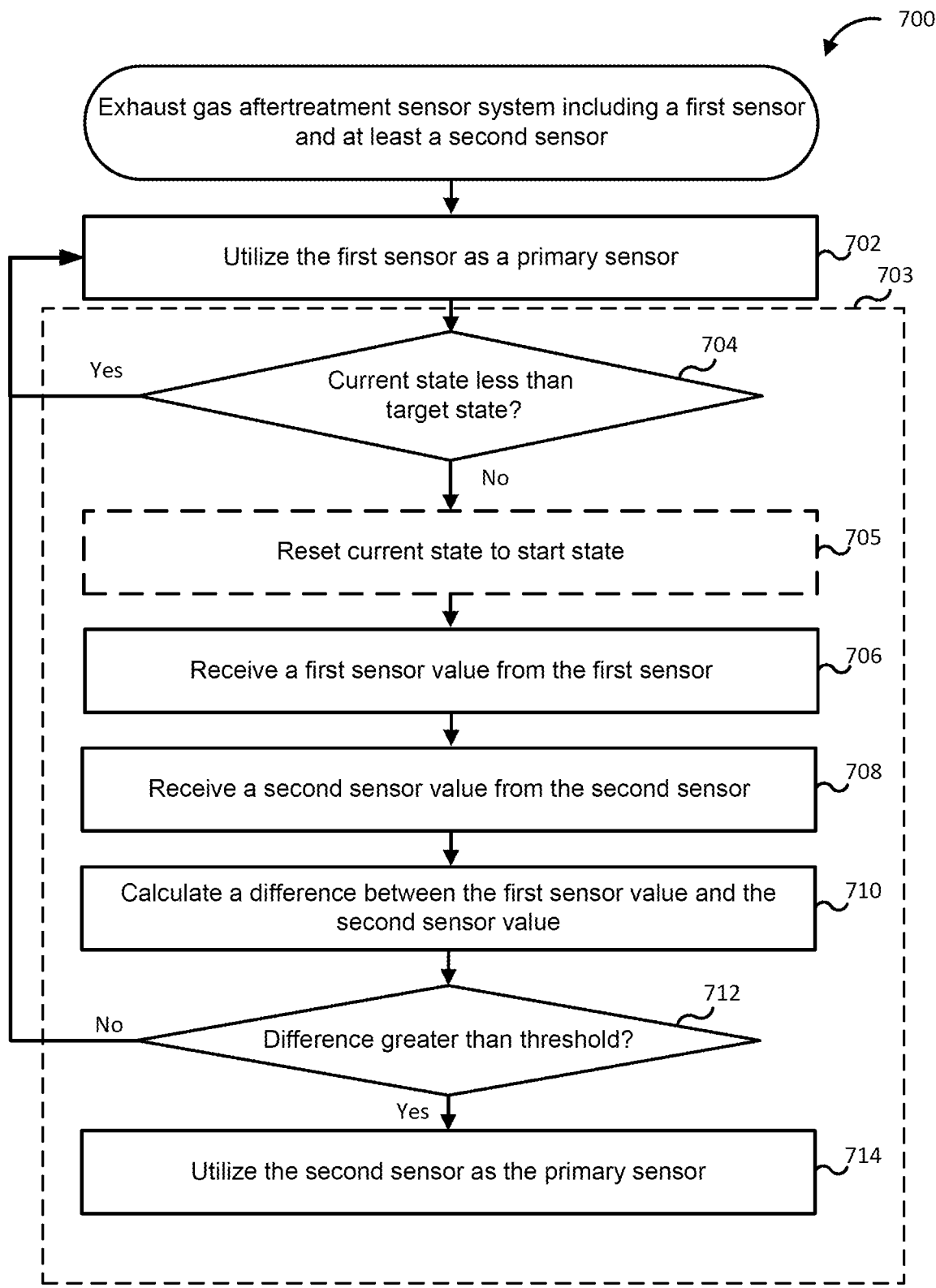
FIG. 7 is a flow chart of an example serial process implemented by an exhaust gas aftertreatment sensor system, according to an embodiment.

FIG. 7 is a flow chart of a serial process 700 (e.g., method, procedure, etc.) for controlling operation of one or more sensors in the exhaust gas aftertreatment system 102 or the exhaust gas aftertreatment system 402. The serial process 700 is described with reference to the first sensor 202 and the second sensor 204. It is understood that the first sensor 202 is any of the first engine-out $NO_x$ sensor 150a, the second engine-out $NO_x$ sensor 150b, the third engine-out $NO_x$ sensor 150c, the first particulate sensor 160a, the second particulate sensor 160b, the third particulate sensor 160c, the first $NH_3$ sensor 162a, the second $NH_3$ sensor 162b, the third $NH_3$ sensor 162c, the first system-out $NO_x$ sensor 164a, the second system-out $NO_x$ sensor 164b, the third system-out $NO_x$ sensor 164c, the first engine-out $NO_x$ sensor 450a, the second engine-out $NO_x$ sensor 450b, the third engine-out $NO_x$ sensor 450c, the first particulate sensor 460a, the second particulate sensor 460b, the third particulate sensor 460c, the first $NH_3$ sensor 462a, the second $NH_3$ sensor 462b, the third $NH_3$ sensor 462c, the first system-out $NO_x$ sensor 464a, the second system-out $NO_x$ sensor 464b, or the third system-out $NO_x$ sensor 464c.

Similarly, it is understood that the second sensor 204 is any of the first engine-out $NO_x$ sensor 150a, the second engine-out $NO_x$ sensor 150b, the third engine-out $NO_x$ sensor 150c, the first particulate sensor 160a, the second particulate sensor 160b, the third particulate sensor 160c, the first $NH_3$ sensor 162a, the second $NH_3$ sensor 162b, the third $NH_3$ sensor 162c, the first system-out $NO_x$ sensor 164a, the second system-out $NO_x$ sensor 164b, the third system-out $NO_x$ sensor 164c, the first engine-out $NO_x$ sensor 450a, the second engine-out $NO_x$ sensor 450b, the third engine-out $NO_x$ sensor 450c, the first particulate sensor 460a, the second particulate sensor 460b, the third particulate sensor 460c, the first $NH_3$ sensor 462a, the second $NH_3$ sensor 462b, the third $NH_3$ sensor 462c, the first system-out $NO_x$ sensor 464a, the second system-out $NO_x$ sensor 464b, or the third system-out $NO_x$ sensor 464c. The serial process 700 can be implemented with the first exhaust gas aftertreatment sensor system 157 or the second exhaust gas aftertreatment sensor system 457.

The serial process 700 starts in block 702 with utilizing (e.g., selecting, using, etc.), by the exhaust gas aftertreatment system controller 132 or the controller 432, the first sensor 202 as the primary sensor. The exhaust gas aftertreatment system controller 132 or the controller 432 can utilize the second sensor 204 as a secondary sensor or supporting sensor. During the serial process 700, the primary sensor and the secondary sensor are both measuring a parameter (e.g., the same parameter) of the exhaust gas flowing through the exhaust gas aftertreatment system 102 or the exhaust gas aftertreatment system 102. The parameter can be a gas (e.g., $NO_x$, $NH_3$, $O_2$, etc.) concentration, engine-out $NO_x$ concentration, system-out $NO_x$ concentration, particulate matter concentration, particulate number, or pressure) in the exhaust gas aftertreatment system 102 or the exhaust gas aftertreatment system 402. The exhaust gas aftertreatment system controller 132 or the controller 432 uses the sensor values from the primary sensor to control operation of the exhaust gas aftertreatment system 102 or the exhaust gas aftertreatment system 402. The exhaust gas aftertreatment system controller 132 or the controller 432 uses the sensor values from the secondary sensor to check if the primary sensor has failed. The primary sensor, the first sensor 202, operates until failure, at which point, a supporting sensor (e.g., secondary sensor, tertiary sensor), the second sensor 204, assumes the role of the primary sensor. Failure of the primary sensor, the first sensor 202, may occur when, for example, the first sensor 202 accumulates debris, dirt or dust, becomes contaminated by chemicals that leak into the exhaust gas aftertreatment system 102, the heater fails, or the sensor cracks.

The serial process 700 then progresses through a sensor check process 703 (e.g., method, procedure, etc.). The sensor check process 703 starts in block 704 with determining, by the exhaust gas aftertreatment system controller 132 or the controller 432, if a current state is less than a target state. The current state can include a start state of 0 (e.g. 0 miles, 0 hours, etc.). The current state can change upon operation of the internal combustion engine 108 as the vehicle system increases mileage or operates for a period of time. The target state can include a number of miles (e.g., 1,000 miles, 5,000 miles, 10,000 miles, etc.) or a number of hours (e.g., 100 hours, 1000 hours, 2000 hours, etc.). If the exhaust gas aftertreatment system controller 132 or the controller 432 determines that the current state is less than the target state, then the sensor check process 703 ends and the serial process 700 continues to block 702 (e.g., is re-run, etc.).

If the exhaust gas aftertreatment system controller 132 or the controller 432 determines that the current state is greater than or equal to the target state, then the sensor check process 703 continues in block 705 with resetting, by the exhaust gas aftertreatment system controller 132 or the controller 432, the current state to the start state.

The sensor check process 703 continues in block 706 with receiving, by the exhaust gas aftertreatment system controller 132 or the controller 432, a first sensor value ($V_{first\ sensor}$) from the first sensor 202. At target intervals, the exhaust gas aftertreatment system controller 132 or the controller 432 can receive the $V_{first\ sensor}$ from the first sensor 202. The target interval can be the difference between the target state and the start state. The target interval can be an amount of time (e.g., 100 hours, 1000 hours, 2000 hours, etc.) set by the exhaust gas aftertreatment system controller 132 or the controller 432. The target interval can be a number of miles (e.g., 1,000 miles, 5,000 miles, 10,000 miles, etc.) set by the exhaust gas aftertreatment system controller 132 or the controller 432. For example, the $V_{first\ sensor}$ may be equal to a parameter (e.g., a gas (e.g., $NO_x$, $NH_3$, $O_2$, etc.) concentration, engine-out $NO_x$ concentration, system-out $NO_x$ concentration, particulate matter concentration, particulate number, or pressure) received by the first sensor 202.

The sensor check process 703 continues in block 708 with receiving, by the exhaust gas aftertreatment system controller 132 or the controller 432, a second sensor value ($V_{second\ sensor}$) from the second sensor 204. The second sensor 204 can measure the same parameter as the first sensor 202. At target intervals, the exhaust gas aftertreatment system controller 132 or the controller 432 can receive the $V_{second\ sensor}$ from the second sensor 204. For example, the $V_{second\ sensor}$ may be equal to a parameter (e.g., a gas (e.g., $NO_x$, $NH_3$, $O_2$, etc.) concentration, engine-out $NO_x$ concentration, system-out $NO_x$ concentration particulate matter concentration, particulate number, or pressure) received by the first sensor 202.

The sensor check process 703 continues in block 710 with calculating, by the exhaust gas aftertreatment system controller 132, a difference between the $V_{first\ sensor}$ and the $V_{second\ sensor}$. For example, the difference between the $V_{first\ sensor}$ and the $V_{second\ sensor}$ can be the $V_{first\ sensor}$ subtracted from the $V_{second\ sensor}$. The difference between the $V_{first\ sensor}$ and the $V_{second\ sensor}$ can be the $V_{second\ sensor}$ subtracted from the $V_{first\ sensor}$.

The sensor check process 703 continues in block 712 with determining, by the exhaust gas aftertreatment system controller 132 or the controller 432, if the difference between the $V_{first\ sensor}$ and the $V_{second\ sensor}$ is greater than a threshold value ($V_{threshold}$). For example, the difference between the $V_{first\ sensor}$ and the $V_{second\ sensor}$ can be less than the $V_{threshold}$, equal to the $V_{threshold}$, or greater than the $V_{threshold}$. In some embodiments, block 712 may be represented by $$V_{first\ sensor} - V_{second\ sensor} > V_{threshold} \quad (1)$$

If the difference between the $V_{first\ sensor}$ and the $V_{second\ sensor}$ is less than or equal to the $V_{threshold}$ (e.g., if Equation (1) is not true, etc.), the exhaust gas aftertreatment system controller 132 or the controller 432 can continue utilizing the first sensor 202 as the primary sensor.

If the exhaust gas aftertreatment system controller 132 or the controller 432 determines that the difference between the $V_{first\ sensor}$ and the $V_{second\ sensor}$ is greater than the $V_{threshold}$ (e.g., if Equation 1 is true, etc.), then the sensor check process 703 continues in block 714 with utilizing, by the exhaust gas aftertreatment system controller 132 or the controller 432, the second sensor 204 as the primary sensor for measuring the parameter in the exhaust gas aftertreatment system 102.

In some embodiments, the serial process 700 can be utilized in the exhaust gas aftertreatment system 102 or the exhaust gas aftertreatment system 402 including a third sensor 206. The serial process 700 is described with reference to the third sensor 206. It is understood that the third sensor 206 is any of the first engine-out $NO_x$ sensor 150a, the second engine-out $NO_x$ sensor 150b, the third engine-out $NO_x$ sensor 150c, the first particulate sensor 160a, the second particulate sensor 160b, the third particulate sensor 160c, the first $NH_3$ sensor 162a, the second $NH_3$ sensor 162b, the third $NH_3$ sensor 162c, the first system-out $NO_x$ sensor 164a, the second system-out $NO_x$ sensor 164b, the third system-out $NO_x$ sensor 164c, the first engine-out $NO_x$ sensor 450a, the second engine-out $NO_x$ sensor 450b, the third engine-out $NO_x$ sensor 450c, the first particulate sensor 460a, the second particulate sensor 460b, the third particulate sensor 460c, the first $NH_3$ sensor 462a, the second $NH_3$ sensor 462b, the third $NH_3$ sensor 462c, the first system-out $NO_x$ sensor 464a, the second system-out $NO_x$ sensor 464b, or the third system-out $NO_x$ sensor 464c.

The exhaust gas aftertreatment system 102 or the exhaust gas aftertreatment system 402 includes a third sensor 206 disposed proximate the first sensor 202 and the second sensor 204 and configured to measure the parameter in the exhaust gas aftertreatment system 102. The exhaust gas aftertreatment system controller 132 or the controller 432 can receive a third sensor value from the third sensor. The exhaust gas aftertreatment system controller 132 or the controller 432 can calculate a difference between the $V_{second\ sensor}$ and the third sensor value. The exhaust gas aftertreatment system controller 132 or the controller 432 can determine if the difference between the $V_{second\ sensor}$ and the third sensor value is greater than the $V_{threshold}$. If the difference between the $V_{second\ sensor}$ and the third sensor value is greater than the $V_{threshold}$, the exhaust gas aftertreatment system controller 132 or the controller 432 can stop utilizing the second sensor 204 as the primary sensor for measuring the parameter in exhaust gas aftertreatment system and begin utilizing the third sensor as the primary sensor for measuring the parameter in exhaust gas aftertreatment system.

In some embodiments, the $V_{threshold}$ is calculated based on aftertreatment operating conditions. For example, the exhaust gas aftertreatment system controller 132 or the controller 432 calculates the $V_{threshold}$ based on at least one aftertreatment operating condition and/or at least one engine operating condition. An engine operating condition can include exhaust temperatures (e.g., dew point temperature) or an idle condition. For example, the dew point temperature can include a temperature above which the sensor will turn on and below which the sensor will turn off. In some embodiments, the first sensor 202 includes at least one of a multiple gas sensor, a particulate matter sensor, a particulate number sensor, or a delta pressure sensor. In some embodiments, the first sensor 202 includes a plurality of sensing elements. In some embodiments, the first sensor 202 includes a first filter and the second sensor 204 includes a second filter.

In some embodiments, the serial process 700 includes determining a difference between the $V_{first\ sensor}$ and a calculated sensor value, the calculated sensor value based on at least one aftertreatment operating condition and/or at least one engine operating condition. For example, the exhaust gas aftertreatment system controller 132 or the controller 432 can determine a difference between the $V_{first\ sensor}$ and a calculated sensor value. The exhaust gas aftertreatment system controller 132 or the controller 432 can determine a difference between the $V_{second\ sensor}$ and the calculated sensor value. If the difference between the $V_{first\ sensor}$ and the calculated sensor value is less than or equal to the difference between the $V_{second\ sensor}$ and the calculated sensor value, the exhaust gas aftertreatment system controller 132 or the controller 432 can utilize the first sensor as the primary sensor for measuring the parameter in exhaust gas aftertreatment system. If the difference between the $V_{first\ sensor}$ and the calculated sensor value is greater than the difference between the $V_{second\ sensor}$ and the calculated sensor value, the exhaust gas aftertreatment system controller 132 or the controller 432 can utilize the second sensor as the primary sensor for measuring the parameter in exhaust gas aftertreatment system.

The controller 132 or the controller 432 can contain logic to limit operation in a comparison mode (e.g., instantaneous comparison mode, time averaged comparison mode, etc.) during certain engine operating conditions (e.g., exhaust temperature, idle condition, etc.). For example, the comparison mode may operate at an exhaust temperature above 200° C. and may not operate (e.g., be disabled) at exhaust temperatures at or below 200° C. The controller 132 or the controller 432 can average sensor values from the first sensor 202 and the second sensor 204. The controller 132 or the controller 432 can average sensor values from the first sensor 202 and sensor values from the second sensor 204 on a second by second basis, a time-averaged basis (e.g., 30 second moving average, 60 second moving average, etc.), or a time-weighted average basis. For example, using the moving average can suppress an error due to a cold start whereby a sensor provides an inaccurate or bad reading during the cold start but is otherwise fully operational.

Figure 8:
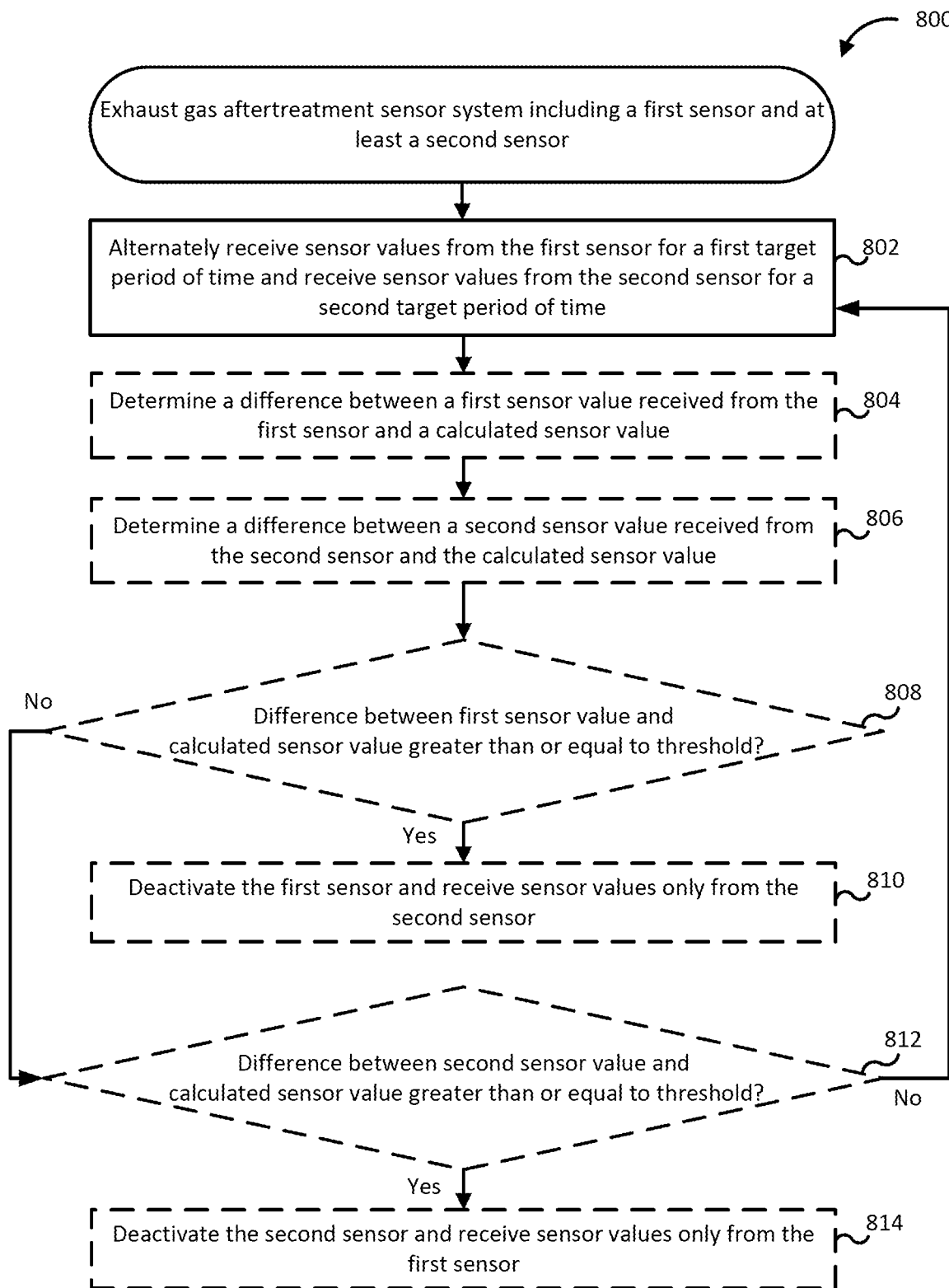
FIG. 8 is a flow chart of an example alternating selection process implemented by an exhaust gas aftertreatment sensor system, according to an embodiment.

VII. Example Alternating Selection Process for an Exhaust Gas Aftertreatment System FIG. 8 is a flow chart of an alternating selection process 800 (e.g., method, procedure, etc.) for controlling operation of one or more sensors in the exhaust gas aftertreatment system 102 or the exhaust gas aftertreatment system 402. The alternating selection process 800 is described with reference to the first sensor 202 and the second sensor 204. It is understood that the first sensor 202 is any of the first engine-out $NO_x$ sensor 150a, the second engine-out $NO_x$ sensor 150b, the third engine-out $NO_x$ sensor 150c, the first particulate sensor 160a, the second particulate sensor 160b, the third particulate sensor 160c, the first $NH_3$ sensor 162a, the second $NH_3$ sensor 162b, the third $NH_3$ sensor 162c, the first system-out $NO_x$ sensor 164a, the second system-out $NO_x$ sensor 164b, the third system-out $NO_x$ sensor 164c, the first engine-out $NO_x$ sensor 450a, the second engine-out $NO_x$ sensor 450b, the third engine-out $NO_x$ sensor 450c, the first particulate sensor 460a, the second particulate sensor 460b, the third particulate sensor 460c, the first $NH_3$ sensor 462a, the second $NH_3$ sensor 462b, the third $NH_3$ sensor 462c, the first system-out $NO_x$ sensor 464a, the second system-out $NO_x$ sensor 464b, or the third system-out $NO_x$ sensor 464c.

Similarly, it is understood that the second sensor 204 is any of the first engine-out $NO_x$ sensor 150a, the second engine-out $NO_x$ sensor 150b, the third engine-out $NO_x$ sensor 150c, the first particulate sensor 160a, the second particulate sensor 160b, the third particulate sensor 160c, the first $NH_3$ sensor 162a, the second $NH_3$ sensor 162b, the third $NH_3$ sensor 162c, the first system-out $NO_x$ sensor 164a, the second system-out $NO_x$ sensor 164b, the third system-out $NO_x$ sensor 164c, the first engine-out $NO_x$ sensor 450a, the second engine-out $NO_x$ sensor 450b, the third engine-out $NO_x$ sensor 450c, the first particulate sensor 460a, the second particulate sensor 460b, the third particulate sensor 460c, the first $NH_3$ sensor 462a, the second $NH_3$ sensor 462b, the third $NH_3$ sensor 462c, the first system-out $NO_x$ sensor 464a, the second system-out $NO_x$ sensor 464b, or the third system-out $NO_x$ sensor 464c. The alternating selection process 800 can be implemented with the first exhaust gas aftertreatment sensor system 157 or the second exhaust gas aftertreatment sensor system 457.

The alternating selection process 800 starts in block 802 with alternately receiving (e.g., acquiring, accepting, collecting, gathering, etc.), by the exhaust gas aftertreatment system controller 132 or the controller 432, sensor values from the first sensor 202 for a first target period of time and receiving (e.g., acquiring, accepting, collecting, gathering, etc.), by the exhaust gas aftertreatment system controller 132 or the controller 432, sensor values from the second sensor 204 for a second target period of time. The first target period of time and the second target period of time can be a range of times (e.g., between 0 and 100 hours, between 100 and 150 hours, etc.). Alternately is intended to mean that the exhaust gas aftertreatment system controller 132 or the controller 432 receives sensor values from the first sensor 202 followed by the sensor values from the second sensor 204 in an alternating fashion. For example, the first sensor 202 and the second sensor 204 operate an equal fraction of time, switching at a defined time interval (e.g., every 100 hours, every 1000 hours, etc.). The exhaust gas aftertreatment system controller 132 or the controller 432 can receive sensor values from the first sensor 202 for the first target period of time of between 0 and 100 hours. Between 0 and 100 hours, the exhaust gas aftertreatment system controller 132 or the controller 432 does not receive sensor values from the second sensor 204. The exhaust gas aftertreatment system controller 132 or the controller 432 can receive sensor values from the second sensor 204 for the second target period of time between 100 hours and 200 hours. Between 100 hours and 200 hours, the exhaust gas aftertreatment system controller 132 or the controller 432 does not receive sensor values from the first sensor 202. The exhaust gas aftertreatment system controller 132 or the controller 432 can receive sensor values from the first sensor 202 for the first target period of time between 200 and 300 hours. Between 200 and 300 hours, the exhaust gas aftertreatment system controller 132 or the controller 432 does not receive sensor values from the second sensor 204. The exhaust gas aftertreatment system controller 132 or the controller 432 can receive sensor values from the second sensor 204 for the second target period of time between 300 hours and 400 hours. Between 300 hours and 400 hours, the exhaust gas aftertreatment system controller 132 or the controller 432 does not receive sensor values from the first sensor 202. In the manner described above, the exhaust gas aftertreatment system controller 132 or the controller 432 alternately receives sensor values from the first sensor 202 for the first target period of time beginning every 200 hours for 100 hours each time and receives sensor values from the second sensor 204 for the second target period of time beginning every 200 hours for 100 hours each time.

In another example, the first sensor 202 and the second sensor 204 operate an unequal fraction of time, switching at a defined time interval. The exhaust gas aftertreatment system controller 132 or the controller 432 can receive sensor values from the first sensor 202 for the first target period of time between 0 and 100 hours. Between 0 and 100 hours, the exhaust gas aftertreatment system controller 132 or the controller 432 does not receive sensor values from the second sensor 204. The exhaust gas aftertreatment system controller 132 or the controller 432 can receive sensor values from the second sensor 204 for the second target period of time between 100 hours and 150 hours. Between 100 hours and 150 hours, the exhaust gas aftertreatment system controller 132 or the controller 432 does not receive sensor values from the first sensor 202. The exhaust gas aftertreatment system controller 132 or the controller 432 can receive sensor values from the first sensor 202 for the first target period of time between 150 and 250 hours. Between 150 and 250 hours, the exhaust gas aftertreatment system controller 132 or the controller 432 does not receive sensor values from the second sensor 204. The exhaust gas aftertreatment system controller 132 or the controller 432 can receive sensor values from the second sensor 204 for the second target period of time between 250 hours and 300 hours. Between 250 hours and 300 hours, the exhaust gas aftertreatment system controller 132 or the controller 432 does not receive sensor values from the first sensor 202. In the manner described above, the exhaust gas aftertreatment system controller 132 or the controller 432 alternately receives sensor values from the first sensor 202 for the first target period of time beginning every 150 hours for 100 hours each time and receives sensor values from the second sensor 204 for the second target period of time beginning every 150 hours for 50 hours each time.

In some embodiments, the alternating selection process 800 continues in block 804 with determining, by the exhaust gas aftertreatment system controller 132 or the controller 432, a difference between a Vast sensor received from the first sensor and a calculated sensor value ($V_{calculated}$). The $V_{calculated}$ can be based on at least one aftertreatment operating condition and/or at least one engine operating condition.

In some embodiments, the alternating selection process 800 continues in block 806 with determining, by the exhaust gas aftertreatment system controller 132 or the controller 432, a difference between a $V_{second\ sensor}$ received from the second sensor and the $V_{calculated}$. The $V_{calculated}$ can be based on at least one aftertreatment operating condition and/or at least one engine operating condition. The difference between the $V_{second\ sensor}$ received from the second sensor and the $V_{calculated}$ can be based on instantaneous sensor readings (e.g., instantaneous $V_{second\ sensor}$ readings) or time averaged readings (e.g., time averaged $V_{second\ sensor}$ readings).

The controller 132 or the controller 432 can contain logic to limit operation in a comparison mode (e.g., instantaneous comparison mode, time averaged comparison mode, etc.) during certain engine operating conditions (e.g., exhaust temperature, idle condition, etc.). For example, the comparison mode may operate at an exhaust temperature above 200° C. and may not operate (e.g., be disabled) at exhaust temperatures at or below 200° C. The controller 132 or the controller 432 can average sensor values from the first sensor 202 and the second sensor 204. The controller 132 or the controller 432 can average sensor values from the first sensor 202 and sensor values from the second sensor 204 on a second by second basis, a time-averaged basis (e.g., 30 second moving average, 60 second moving average, etc.), or a time-weighted average basis. For example, using the moving average can suppress an error due to a cold start whereby a sensor provides an inaccurate or bad reading during the cold start but is otherwise fully operational.

In some embodiments, the alternating selection process 800 continues in block 808 with determining, by the exhaust gas aftertreatment system controller 132 or the controller 432, if the difference between the $V_{first\ sensor}$ and the $V_{calculated}$ is greater than or equal to a $V_{threshold}$. For example, the difference between the $V_{first\ sensor}$ and the $V_{calculated}$ can be less than the $V_{threshold}$, equal to the $V_{threshold}$, or greater than the $V_{threshold}$. In some embodiments, block 808 may be represented by $$V_{first\ sensor} - V_{calculated} \geq V_{threshold} \qquad (2)$$

If the difference between the $V_{first\ sensor}$ and the $V_{calculated}$ is greater than or equal to the $V_{threshold}$ (e.g., if Equation (2)

is true, etc.), the alternating selection process 800 continues in block 810 with deactivating, by the exhaust gas aftertreatment system controller 132 or the controller 432, the first sensor 202 and receiving sensor values only from the second sensor 204.

If the difference between the $V_{first\ sensor}$ and the $V_{calculated}$ is less than the $V_{threshold}$ (e.g., if Equation (2) is not true, etc.), the exhaust gas aftertreatment system controller 132 or the controller 432 continues in block 812 determining, by the exhaust gas aftertreatment system controller 132 or the controller 432, if the difference between the $V_{second\ sensor}$ and the $V_{calculated}$ is greater than or equal to the $V_{threshold}$. For example, the difference between the $V_{second\ sensor}$ and the $V_{calculated}$ can be less than the $V_{threshold}$, equal to the $V_{threshold}$, or greater than the $V_{threshold}$. In some embodiments, block 812 may be represented by $$V_{second\ sensor} - V_{calculated} \geq V_{threshold} \qquad (3)$$

If the difference between the $V_{second\ sensor}$ and the $V_{calculated}$ is greater than or equal to the $V_{threshold}$ (e.g., if Equation (3) is true, etc.), the alternating selection process 800 continues in block 814 with deactivating, by the exhaust gas aftertreatment system controller 132 or the controller 432 the second sensor 204 and receiving sensor values only from the first sensor 202.

If the difference between the $V_{second\ sensor}$ and the $V_{calculated}$ is less than the threshold (e.g., if Equation (3) is not true, etc.), the alternating selection process 800 continues to block 802 (e.g., is re-run, etc.).

In some embodiments, the alternating selection process 800 can be utilized in the exhaust gas aftertreatment system 102 or the exhaust gas aftertreatment system 402 including a third sensor 206. The alternating selection process 800 is described with reference to the third sensor 206. It is understood that the third sensor 206 is any of the first engine-out $NO_x$ sensor 150a, the second engine-out $NO_x$ sensor 150b, the third engine-out $NO_x$ sensor 150c, the first particulate sensor 160a, the second particulate sensor 160b, the third particulate sensor 160c, the first $NH_3$ sensor 162a, the second $NH_3$ sensor 162b, the third $NH_3$ sensor 162c, the first system-out $NO_x$ sensor 164a, the second system-out $NO_x$ sensor 164b, the third system-out $NO_x$ sensor 164c, the first engine-out $NO_x$ sensor 450a, the second engine-out $NO_x$ sensor 450b, the third engine-out $NO_x$ sensor 450c, the first particulate sensor 460a, the second particulate sensor 460b, the third particulate sensor 460c, the first $NH_3$ sensor 462a, the second $NH_3$ sensor 462b, the third $NH_3$ sensor 462c, the first system-out $NO_x$ sensor 464a, the second system-out $NO_x$ sensor 464b, or the third system-out $NO_x$ sensor 464c.

The exhaust gas aftertreatment system 102 or the exhaust gas aftertreatment system 402 includes a third sensor 206 disposed proximate the first sensor 202 and the second sensor 204 and configured to measure the parameter in the exhaust gas aftertreatment system 102. The exhaust gas aftertreatment system controller 132 or the controller 432 can alternately receive a third sensor value from the third sensor for a third target period of time. The third target period of time can be a range of times (e.g., between 0 and 100 hours, between 100 and 150 hours, etc.). The exhaust gas aftertreatment system controller 132 or the controller 432 can determine a difference between a third sensor value received from the third sensor and the $V_{calculated}$. If the difference between the third sensor value and the $V_{calculated}$ is greater than or equal to the $V_{threshold}$, the exhaust gas aftertreatment system controller 132 or the controller 432 can deactivate the third sensor 206 and receive sensor values only from the second sensor 204. If the difference between the $V_{second\ sensor}$ and the $V_{calculated}$ is greater than or equal to the $V_{threshold}$, the exhaust gas aftertreatment system controller 132 or the controller 432 can deactivate the second sensor 204 and receive sensor values only from the third sensor 206.

In some embodiments, the first sensor 202 includes at least one of a multiple gas sensor, a particulate matter sensor, a particulate number sensor, or a delta pressure sensor. In some embodiments, the first sensor 202 includes a plurality of sensing elements. In some embodiments, the first sensor 202 includes a first filter and the second sensor 204 includes a second filter.

Figure 9:
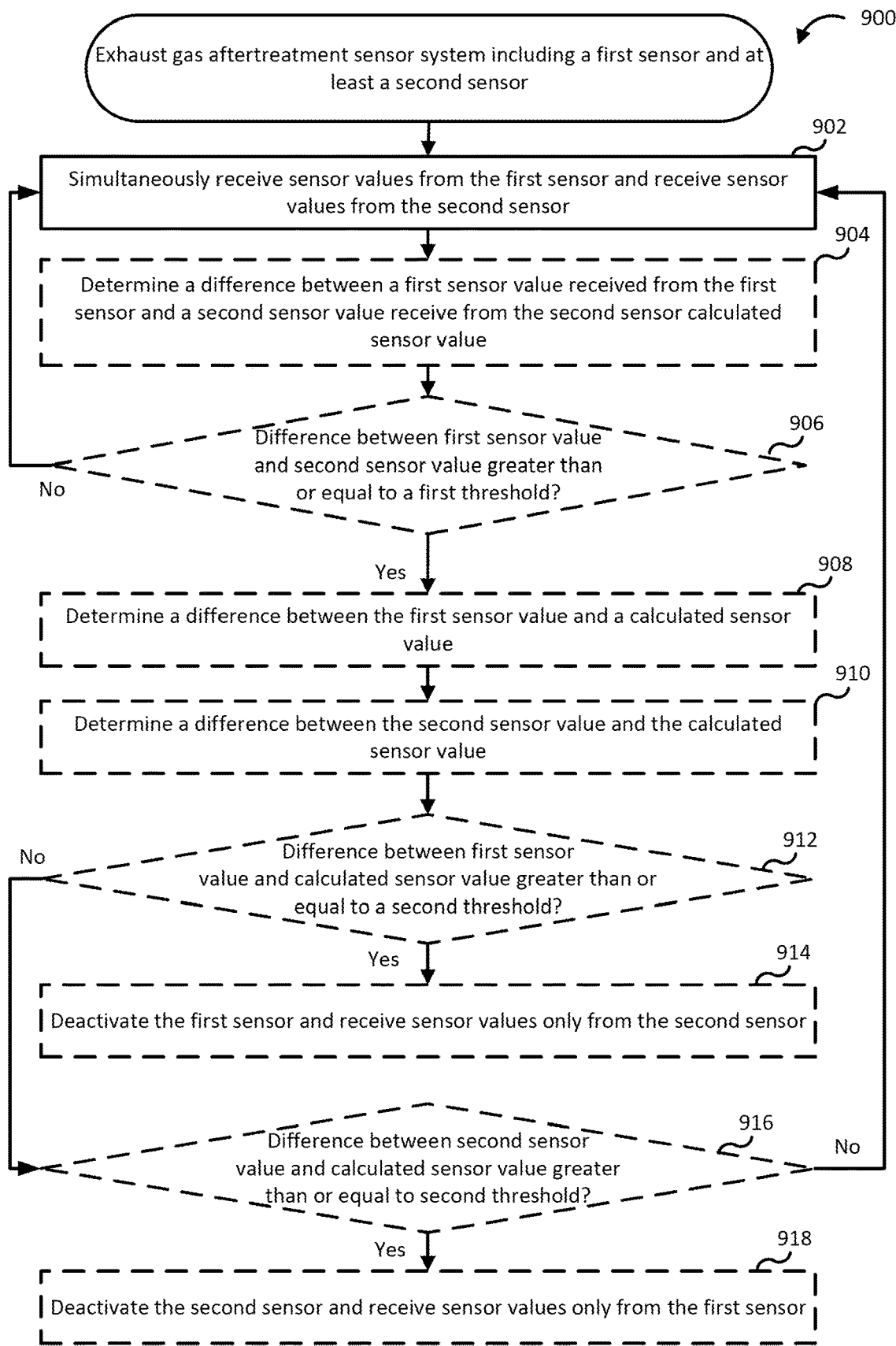
FIG. 9 is a flow chart of an example simultaneous selection process implemented by an exhaust gas aftertreatment sensor system, according to an embodiment.

VIII. Example Simultaneous Selection Process for an Exhaust Gas Aftertreatment System FIG. 9 is a flow chart of a simultaneous selection process 900 (e.g., method, procedure, etc.) for controlling operation of one or more sensors in the exhaust gas aftertreatment system 102 or the exhaust gas aftertreatment system 402. The simultaneous selection process 900 can generate an average sensor value based on multiple sensors, thereby providing a more accurate concentration in comparison to a single sensor value. The average sensor value can also facilitate the detection of a failing or failed sensor based on sensor values of multiple sensors. The simultaneous selection process 900 is described with reference to the first sensor 202 and the second sensor 204. It is understood that the first sensor 202 is any of the first engine-out $NO_x$ sensor 150a, the second engine-out $NO_x$ sensor 150b, the third engine-out $NO_x$ sensor 150c, the first particulate sensor 160a, the second particulate sensor 160b, the third particulate sensor 160c, the first $NH_3$ sensor 162a, the second $NH_3$ sensor 162b, the third $NH_3$ sensor 162c, the first system-out $NO_x$ sensor 164a, the second system-out $NO_x$ sensor 164b, the third system-out $NO_x$ sensor 164c, the first engine-out $NO_x$ sensor 450a, the second engine-out $NO_x$ sensor 450b, the third engine-out $NO_x$ sensor 450c, the first particulate sensor 460a, the second particulate sensor 460b, the third particulate sensor 460c, the first $NH_3$ sensor 462a, the second $NH_3$ sensor 462b, the third $NH_3$ sensor 462c, the first system-out $NO_x$ sensor 464a, the second system-out $NO_x$ sensor 464b, or the third system-out $NO_x$ sensor 464c.

Similarly, it is understood that the second sensor 204 is any of the first engine-out $NO_x$ sensor 150a, the second engine-out $NO_x$ sensor 150b, the third engine-out $NO_x$ sensor 150c, the first particulate sensor 160a, the second particulate sensor 160b, the third particulate sensor 160c, the first $NH_3$ sensor 162a, the second $NH_3$ sensor 162b, the third $NH_3$ sensor 162c, the first system-out $NO_x$ sensor 164a, the second system-out $NO_x$ sensor 164b, the third system-out $NO_x$ sensor 164c, the first engine-out $NO_x$ sensor 450a, the second engine-out $NO_x$ sensor 450b, the third engine-out $NO_x$ sensor 450c, the first particulate sensor 460a, the second particulate sensor 460b, the third particulate sensor 460c, the first $NH_3$ sensor 462a, the second $NH_3$ sensor 462b, the third $NH_3$ sensor 462c, the first system-out $NO_x$ sensor 464a, the second system-out $NO_x$ sensor 464b, or the third system-out $NO_x$ sensor 464c. The simultaneous selection process 900 can be implemented with the first exhaust gas aftertreatment sensor system 157 or the second exhaust gas aftertreatment sensor system 457.

The simultaneous selection process 900 starts in block 902 with simultaneously receiving (e.g., acquiring, accepting, collecting, gathering, etc.), by the exhaust gas aftertreatment system controller 132 or the controller 432, sensor values from the first sensor 202 and receiving (e.g., acquiring, accepting, collecting, gathering, etc.), by the exhaust gas aftertreatment system controller 132 or the controller 432, sensor values from the second sensor 204. The sensor values from the first sensor 202 and the sensor values from the second sensor 204 can be averaged by the exhaust gas aftertreatment system controller 132 or the controller 432 to provide a more accurate concentration in comparison to sensor values from either the first sensor 202 or second sensor 204 alone. The exhaust gas aftertreatment system controller 132 or the controller 432 can average sensor values from the first sensor 202 and sensor values from the second sensor 204 on a second by second basis or a time-averaged basis (e.g., 30 second moving average, 60 second moving average, etc.).

The controller 132 or the controller 432 can contain logic to limit operation in a comparison mode (e.g., instantaneous comparison mode, time averaged comparison mode, etc.) during certain engine operating conditions (e.g., exhaust temperature, idle condition, etc.). For example, the comparison mode may operate at an exhaust temperature above 200° C. and may not operate (e.g., be disabled) at exhaust temperatures at or below 200° C. The controller 132 or the controller 432 can average sensor values from the first sensor 202 and the second sensor 204. The controller 132 or the controller 432 can average sensor values from the first sensor 202 and sensor values from the second sensor 204 on a second by second basis, a time-averaged basis (e.g., 30 second moving average, 60 second moving average, etc.), or a time-weighted average basis. For example, using the moving average can suppress an error due to a cold start whereby a sensor provides an inaccurate or bad reading during the cold start but is otherwise fully operational.

In some embodiments, the simultaneous selection process 900 continues in block 904 with determining, by the exhaust gas aftertreatment system controller 132 or the controller 432, a difference between a Vast sensor received from the first sensor 202 and a $V_{second\ sensor}$ received from the second sensor 204.

In some embodiments, the simultaneous selection process 900 continues in block 906 with determining, by the exhaust gas aftertreatment system controller 132 or the controller 432, if the difference between the $V_{first\ sensor}$ received from the first sensor 202 and the $V_{second\ sensor}$ received from the second sensor 204 is greater than or equal to a first threshold value (Vast threshold). For example, the difference between the $V_{first\ sensor}$ received from the first sensor 202 and the $V_{second\ sensor}$ received from the second sensor 204 can be less than the $V_{first\ threshold}$, equal to the $V_{first\ threshold}$, or greater than the $V_{first\ threshold}$. In some embodiments, block 906 may be represented by $$V_{first\ sensor} - V_{second\ sensor} \geq V_{first\ threshold} \qquad (4)$$

If the difference between the $V_{first\ sensor}$ received from the first sensor 202 and the $V_{second\ sensor}$ received from the second sensor 204 is less than the Vast threshold (e.g., if Equation (4) is not true, etc.), the simultaneous selection process 900 continues to block 902 (e.g., is re-run, etc.).

If the difference between the $V_{first\ sensor}$ received from the first sensor 202 and the $V_{second\ sensor}$ received from the second sensor 204 is greater than or equal to the Vast threshold (e.g., if Equation (4) is true, etc.), the simultaneous selection process 900 continues to block 908 with determining, by the exhaust gas aftertreatment system controller 132 or the controller 432, a difference between the $V_{first\ sensor}$ and a $V_{calculated}$. The $V_{calculated}$ can be based on at least one aftertreatment operating condition and/or at least one engine operating condition. The difference between the $V_{first\ sensor}$ and the $V_{calculated}$ can be based on instantaneous sensor readings (e.g., instantaneous $V_{first\ sensor}$ readings) or time averaged readings (e.g., time averaged $V_{first\ sensor}$ readings).

In some embodiments, the simultaneous selection process 900 continues in block 910 with determining, by the exhaust gas aftertreatment system controller 132 or the controller 432, a difference between the $V_{second\ sensor}$ and the $V_{calculated}$. The $V_{calculated}$ can be based on at least one aftertreatment operating condition and/or at least one engine operating condition. The difference between the $V_{second\ sensor}$ and the $V_{calculated}$ can be based on instantaneous sensor readings (e.g., instantaneous $V_{second\ sensor}$ readings) or time averaged readings (e.g., time averaged $V_{second\ sensor}$ readings).

In some embodiments, the simultaneous selection process 900 continues in block 912 with determining, by the exhaust gas aftertreatment system controller 132 or the controller 432, if the difference between the $V_{first\ sensor}$ and the $V_{calculated}$ is greater than or equal to a second threshold ($V_{second\ threshold}$). For example, the difference between the $V_{first\ sensor}$ and the $V_{calculated}$ can be less than the $V_{second\ threshold}$, equal to the $V_{second\ threshold}$, or greater than the $V_{second\ threshold}$. In some embodiments, block 912 may be represented by $$V_{firstSensor} - V_{calculated} \geq V_{second\ threshold} \qquad (5)$$

If the difference between the $V_{first\ sensor}$ and the $V_{calculated}$ is greater than or equal to the $V_{second\ threshold}$ (e.g., if Equation (5) is true, etc.), the simultaneous selection process 900 continues in block 914 with deactivating, by the exhaust gas aftertreatment system controller 132 or the controller 432, the first sensor 202 and receiving sensor values only from the second sensor 204.

If the difference between the $V_{first\ sensor}$ and the $V_{calculated}$ is less than the $V_{second\ threshold}$ (e.g., if Equation (5) is not true, etc.), the simultaneous selection process 900 continues in block 916 determining, by the exhaust gas aftertreatment system controller 132 or the controller 432, if the difference between the $V_{second\ sensor}$ and the $V_{calculated}$ is greater than or equal to the $V_{second\ threshold}$. For example, the difference between the $V_{second\ sensor}$ and the $V_{calculated}$ can be less than the $V_{second\ threshold}$, equal to the $V_{second\ threshold}$, or greater than the $V_{second\ threshold}$. In some embodiments, block 916 may be represented by $$V_{second\ sensor} - V_{calculated} \geq V_{second\ threshold} \qquad (6)$$

If the difference between the $V_{second\ sensor}$ and the $V_{calculated}$ is greater than or equal to the $V_{second\ threshold}$ (e.g., if Equation (6) is true, etc.), the simultaneous selection process 900 continues in block 918 with deactivating, by the exhaust gas aftertreatment system controller 132 or the controller 432 the second sensor 204 and receiving sensor values only from the first sensor 202.

If the difference between the $V_{second\ sensor}$ and the $V_{calculated}$ is less than the second threshold (e.g., if Equation (6) is not true, etc.), the simultaneous selection process 900 continues to block 902 (e.g., is re-run, etc.).

In some embodiments, the simultaneous selection process 900 can be utilized in the exhaust gas aftertreatment system 102 or the exhaust gas aftertreatment system 402 including a third sensor 206. The simultaneous selection process 900 is described with reference to the third sensor 206. It is understood that the third sensor 206 is any of the first engine-out $NO_x$ sensor 150a, the second engine-out $NO_x$ sensor 150b, the third engine-out $NO_x$ sensor 150c, the first particulate sensor 160a, the second particulate sensor 160b, the third particulate sensor 160c, the first $NH_3$ sensor 162a, the second $NH_3$ sensor 162b, the third $NH_3$ sensor 162c, the first system-out $NO_x$ sensor 164a, the second system-out $NO_x$ sensor 164b, the third system-out $NO_x$ sensor 164c, the first engine-out $NO_x$ sensor 450a, the second engine-out $NO_x$ sensor 450b, the third engine-out $NO_x$ sensor 450c, the first particulate sensor 460a, the second particulate sensor 460b, the third particulate sensor 460c, the first $NH_3$ sensor 462a, the second $NH_3$ sensor 462b, the third $NH_3$ sensor 462c, the first system-out $NO_x$ sensor 464a, the second system-out $NO_x$ sensor 464b, or the third system-out $NO_x$ sensor 464c.

The exhaust gas aftertreatment system 102 or the exhaust gas aftertreatment system 402 includes a third sensor 206 disposed proximate the first sensor 202 and the second sensor 204 and configured to measure the parameter in the exhaust gas aftertreatment system 102. The exhaust gas aftertreatment system controller 132 or the controller 432 can simultaneously receive (e.g., acquire, accept, collect, gather, etc.) a third sensor value from the third sensor. The exhaust gas aftertreatment system controller 132 or the controller 432 can determine a difference between a third sensor value received from the third sensor and the $V_{second\ sensor}$ received from the second sensor 204. If the difference between the $V_{second\ sensor}$ and the third sensor value is greater than or equal to the $V_{first\ threshold}$, the exhaust gas aftertreatment system controller 132 or the controller 432 can determine a difference between the third sensor value and the $V_{calculated}$ based on at least one aftertreatment operating condition and/or at least one engine operating condition. If the difference between the third sensor value and the $V_{calculated}$ is greater than or equal to a $V_{second\ threshold}$, the exhaust gas aftertreatment system controller 132 or the controller 432 can deactivate the third sensor 206 and receive sensor values only from the second sensor 204. If the difference between the second sensor value and the $V_{calculated}$ is greater than or equal to a $V_{second\ threshold}$, the exhaust gas aftertreatment system controller 132 or the controller 432 can deactivate the second sensor 204 and receive sensor values only from the third sensor 206.

In some embodiments, the first sensor 202 includes at least one of a multiple gas sensor, a particulate matter sensor, a particulate number sensor, or a delta pressure sensor. In some embodiments, the first sensor 202 includes a plurality of sensing elements. In some embodiments, the first sensor 202 includes a first filter and the second sensor includes a second filter.

IX. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub-combination. Moreover, although features may be described as acting in certain combinations and even initially claimed as such, one or more features from a claimed combination can, in some cases, be excised from the combination, and the claimed combination may be directed to a sub-combination or variation of a sub-combination.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "in fluid communication," and the like, as used herein, mean the two components or objects have a pathway formed between the two components or objects in which a fluid (e.g., exhaust, water, air, gaseous reductant, gaseous ammonia, etc.) may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item, unless specifically stated to the contrary.

What is claimed is:

1. An exhaust gas aftertreatment system comprising:
    an exhaust gas conduit comprising a peripheral wall;
    a first sensor attached to the peripheral wall of the exhaust gas conduit and configured to measure a parameter in the exhaust gas aftertreatment system,;
    a second sensor attached to the peripheral wall of the exhaust gas conduit and configured to measure the parameter in the exhaust gas aftertreatment system, the second sensor disposed proximate the first sensor; and
    at least one controller configured to alternately:
        receive sensor values from the first sensor for a first predetermined period of time, and
        subsequently receive sensor values from the second sensor for a second predetermined period of time,
        subsequently receive sensor values from the first sensor for the first predetermined period of time, and
        subsequently receive sensor values from the second sensor for the second predetermined period of time.

2. The exhaust gas aftertreatment system of claim 1, wherein:
    the at least one controller is configured to:
        determine a difference between a first sensor value received from the first sensor and a calculated sensor value based on at least one aftertreatment operating condition and/or at least one engine operating condition,
        determine a difference between a second sensor value received from the second sensor and the calculated sensor value based on the at least one aftertreatment operating condition and/or the at least one engine operating condition,
        if the difference between the first sensor value and the calculated sensor value is greater than or equal to a threshold value, deactivate the first sensor and receive sensor values only from the second sensor, and
        if the difference between the second sensor value and the calculated sensor value is greater than or equal to the threshold value, deactivate the second sensor and receive sensor values only from the first sensor.

3. The exhaust gas aftertreatment system of claim 2, further comprising:
    a third sensor disposed proximate the first sensor and the second sensor and configured to
    measure the parameter in the exhaust gas aftertreatment system;
    wherein the at least one controller is further configured to:
        alternately receive sensor values from the third sensor for a third predetermined period of time,
        determine a difference between a third sensor value received from the third sensor and the calculated sensor value,
        if the difference between the third sensor value and the calculated sensor value is greater than or equal to the threshold value, deactivate the third sensor and receive sensor values only from the second sensor, and
        if the difference between the second sensor value and the calculated sensor value is greater than or equal to the threshold value, deactivate the second sensor and receive sensor values only from the third sensor.

4. The exhaust gas aftertreatment system of claim 1, wherein the first sensor includes at least one of a multiple gas sensor, a particulate matter sensor, a particulate number sensor, or a delta pressure sensor.

5. The exhaust gas aftertreatment system of claim 1, wherein the first sensor includes a plurality of sensing elements.

6. The exhaust gas aftertreatment system of claim 1, wherein the first sensor includes a first filter and the second sensor includes a second filter.

7. The exhaust gas aftertreatment system of claim 1, wherein the first sensor and the second sensor are disposed at different peripheral locations of the exhaust gas conduit in a cross-section of the exhaust gas conduit that is perpendicular to a longitudinal axis of the exhaust gas conduit.

8. The exhaust gas aftertreatment system of claim 1, wherein a distance between the first sensor and the second sensor is less than or equal to 3 inches.

9. The exhaust gas aftertreatment system of claim 1, wherein a distance between the first sensor and the second sensor is less than or equal to 1 inch.

* * * * *